United States Patent
Billi-Duran et al.

(10) Patent No.: US 10,318,570 B2
(45) Date of Patent: Jun. 11, 2019

(54) MULTIMODAL SEARCH INPUT FOR AN INDUSTRIAL SEARCH PLATFORM

(71) Applicant: Rockwell Automation Technologies, Inc., Mayfield Heights, OH (US)

(72) Inventors: Sharon M. Billi-Duran, Euclid, OH (US); Christopher W. Como, Chagrin Falls, OH (US); Edward A. Gray, Olmstead Township, OH (US); Kyle K. Reissner, Hudson, OH (US); Jonathan D. Walter, Broadview Heights, OH (US); Mohit Singhai, Lyndhurst, OH (US); Douglas J. Reichard, Fairview Park, OH (US); Scott N. Sandler, Chagrin Falls, OH (US); Ronald E. Bliss, Twinsburg, OH (US); Michael J. Pantaleano, Willoughby, OH (US); Ryan Cahalane, Chagrin Falls, OH (US); Jessica L. Korpela, Milwaukee, WI (US); Bruce T. McCleave, Jr., Mission Viejo, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 177 days.

(21) Appl. No.: 15/240,161

(22) Filed: Aug. 18, 2016

(65) Prior Publication Data
US 2018/0052835 A1 Feb. 22, 2018

(51) Int. Cl.
G06F 16/41 (2019.01)
G06F 16/487 (2019.01)

(52) U.S. Cl.
CPC ............ *G06F 16/41* (2019.01); *G06F 16/487* (2019.01)

(58) Field of Classification Search
None
See application file for complete search history.

(56) References Cited

U.S. PATENT DOCUMENTS 5,168,441 A 12/1992 Onarheim et al.
5,777,874 A 7/1998 Flood et al.
(Continued)

FOREIGN PATENT DOCUMENTS

CN 103543700 B 8/2016
EP 1 814 045 A2 8/2007
(Continued)

OTHER PUBLICATIONS

European Office Action for European Patent Application Serial No. 16196582.7-1871 dated Jan. 31, 2017, 9 pages.
(Continued)

*Primary Examiner* — Tuankhanh D Phan
(74) *Attorney, Agent, or Firm* — Amin, Turocy & Watson, LLP

(57) ABSTRACT

An industrial search and diagnosis system discovers available data items across heterogeneous data platforms that make up an industrial enterprise and indexes the data items in a unified searchable namespace. The system also indexes non-textual or multimedia input, including image data, video data, and audio data. This multimedia data can be indexed by the system in association with the relevant industrial systems (e.g., machines, automation systems, devices, production lines, etc.) so that the system can provide the multimedia data to the user when the relevant industrial systems are searched or invoked. The system also accepts and processes multimedia data from as search criteria or for diagnostic analysis. In an example analysis, users can submit images, audio, or video of an industrial machine or automation system, and the diagnosis system can identify an operational
(Continued)

abnormality based on comparative analysis performed on the multimedia information.

20 Claims, 25 Drawing Sheets

(56) References Cited

U.S. PATENT DOCUMENTS

| | | |
|---|---|---|
| 6,002,406 A | 12/1999 | Zhao |
| 6,334,124 B1 | 12/2001 | Bouchard et al. |
| 6,583,794 B1 | 6/2003 | Wattenberg |
| 6,788,315 B1 | 9/2004 | Kekic et al. |
| 7,612,661 B1 | 11/2009 | Johnson et al. |
| 8,285,744 B2 | 10/2012 | Dorgelo et al. |
| 8,453,091 B1 | 5/2013 | Rao et al. |
| 8,489,641 B1 | 7/2013 | Seefeld et al. |
| 8,819,149 B2 | 8/2014 | Amidon et al. |
| 8,886,153 B2 | 11/2014 | Velusamy |
| 9,069,382 B1 | 6/2015 | Starner et al. |
| 9,213,714 B1 | 12/2015 | Ording |
| 9,237,141 B2 | 1/2016 | Logue et al. |
| 9,438,648 B2 | 9/2016 | Asenjo et al. |
| 9,709,978 B2 | 7/2017 | Asenjo et al. |
| 9,937,577 B2 | 4/2018 | Daniel et al. |
| 9,952,882 B2 | 4/2018 | Kuscher et al. |
| 2002/0049775 A1 | 4/2002 | Friedrich et al. |
| 2002/0158873 A1 | 10/2002 | Williamson |
| 2004/0181549 A1 | 9/2004 | Pate |
| 2005/0010307 A1 | 1/2005 | Dove et al. |
| 2005/0023347 A1 | 2/2005 | Wetzel et al. |
| 2005/0188376 A1 | 8/2005 | Matsumoto et al. |
| 2005/0204315 A1 | 9/2005 | Knol et al. |
| 2006/0161544 A1 | 7/2006 | Lee et al. |
| 2006/0241792 A1 | 10/2006 | Pretlove et al. |
| 2006/0271884 A1 | 11/2006 | Hurst |
| 2007/0078824 A1 | 4/2007 | Dorgelo et al. |
| 2008/0072180 A1 | 3/2008 | Chevalier et al. |
| 2009/0077055 A1 | 3/2009 | Dillon et al. |
| 2009/0085934 A1 | 4/2009 | Baier et al. |
| 2009/0086021 A1 | 4/2009 | Baier et al. |
| 2009/0088875 A1 | 4/2009 | Baier et al. |
| 2009/0089225 A1 | 4/2009 | Baier et al. |
| 2009/0112816 A1 | 4/2009 | Marlow |
| 2009/0125796 A1 | 5/2009 | Day et al. |
| 2009/0216341 A1 | 8/2009 | Enkerud et al. |
| 2009/0307162 A1 | 12/2009 | Bui et al. |
| 2009/0307255 A1 | 12/2009 | Park |
| 2010/0016995 A1 | 1/2010 | Barat |
| 2010/0082661 A1 | 4/2010 | Beaudreau |
| 2011/0022198 A1 | 1/2011 | Plache et al. |
| 2011/0119227 A1 | 3/2011 | Wang et al. |
| 2011/0093188 A1 | 4/2011 | Barkai et al. |
| 2011/0115816 A1 | 5/2011 | Brackney |
| 2011/0298579 A1 | 12/2011 | Hardegger et al. |
| 2011/0316845 A1 | 12/2011 | Giambalvo et al. |
| 2012/0120070 A1 | 5/2012 | Baillot |
| 2012/0233573 A1 | 9/2012 | Sullivan et al. |
| 2012/0242648 A1 | 9/2012 | Baier et al. |
| 2012/0249588 A1 | 10/2012 | Tison et al. |
| 2012/0249741 A1 | 10/2012 | MacIocci et al. |
| 2012/0254792 A1 | 10/2012 | Husoy et al. |
| 2012/0259436 A1 | 10/2012 | Resurreccion et al. |
| 2012/0314571 A1 | 12/2012 | Forssell |
| 2013/0006395 A1 | 1/2013 | Plache et al. |
| 2013/0031508 A1 | 1/2013 | Kodosky et al. |
| 2013/0054573 A1 | 2/2013 | Snellman et al. |
| 2013/0073400 A1* | 3/2013 | Heath .............. G06Q 30/02 705/14.73 |
| 2013/0110978 A1 | 5/2013 | Gordon et al. |
| 2013/0120449 A1 | 5/2013 | Ihara et al. |
| 2013/0124253 A1 | 5/2013 | Cooper et al. |
| 2013/0124465 A1 | 5/2013 | Pingel et al. |
| 2013/0124613 A1 | 5/2013 | Plache et al. |
| 2013/0125233 A1 | 5/2013 | Bush et al. |
| 2013/0169681 A1 | 7/2013 | Rasane et al. |
| 2013/0211546 A1 | 8/2013 | Lawson et al. |
| 2013/0211559 A1 | 8/2013 | Lawson et al. |
| 2013/0222373 A1 | 8/2013 | Weinstein et al. |
| 2013/0246539 A1 | 9/2013 | Davis |
| 2013/0083012 A1 | 10/2013 | Han et al. |
| 2013/0257863 A1 | 10/2013 | Mikkelsen |
| 2013/0275908 A1 | 10/2013 | Reichard |
| 2013/0290899 A1 | 10/2013 | Amran |
| 2014/0032849 A1 | 1/2014 | De Vleeschauwer et al. |
| 2014/0047064 A1 | 2/2014 | Maturana et al. |
| 2014/0047106 A1 | 2/2014 | Leung et al. |
| 2014/0047107 A1 | 2/2014 | Maturana et al. |
| 2014/0143395 A1 | 5/2014 | Geltner et al. |
| 2014/0207870 A1 | 7/2014 | Vaya |
| 2014/0240356 A1 | 8/2014 | Cupitt et al. |
| 2014/0250377 A1 | 9/2014 | Bisca et al. |
| 2014/0253588 A1 | 9/2014 | Mandala |
| 2014/0258940 A1 | 9/2014 | Han et al. |
| 2014/0282215 A1 | 9/2014 | Grubbs et al. |
| 2014/0316540 A1 | 10/2014 | Loncar et al. |
| 2014/0335480 A1 | 11/2014 | Asenjo et al. |
| 2014/0336785 A1 | 11/2014 | Asenjo et al. |
| 2014/0358256 A1 | 12/2014 | Billi et al. |
| 2015/0077555 A1 | 3/2015 | Scalisi |
| 2015/0146007 A1 | 5/2015 | Dusik et al. |
| 2015/0213465 A1 | 7/2015 | Noyes et al. |
| 2015/0281329 A1 | 10/2015 | Dimov |
| 2015/0371455 A1 | 12/2015 | Abdel-Rahman et al. |
| 2016/0103750 A1 | 4/2016 | Cooper et al. |
| 2016/0127690 A1 | 5/2016 | Kaehler et al. |
| 2016/0132538 A1 | 5/2016 | Bliss et al. |
| 2016/0132595 A1 | 5/2016 | Bliss et al. |
| 2016/0176724 A1 | 6/2016 | Ji et al. |
| 2016/0217381 A1 | 7/2016 | Bloomquist et al. |
| 2016/0226731 A1* | 8/2016 | Maroulis .............. H04L 43/065 |
| 2016/0267759 A1 | 9/2016 | Kerzner |
| 2016/0274553 A1 | 9/2016 | Strohmenger et al. |
| 2016/0292895 A1 | 10/2016 | Billi et al. |
| 2016/0337289 A1 | 11/2016 | Duca et al. |
| 2016/0337441 A1 | 11/2016 | Bloomquist et al. |
| 2016/0343163 A1 | 11/2016 | Venkatesha et al. |
| 2017/0053445 A1 | 2/2017 | Chen et al. |
| 2017/0060379 A1 | 3/2017 | Capozella et al. |
| 2017/0091607 A1 | 3/2017 | Emeis et al. |
| 2017/0108838 A1 | 4/2017 | Todeschini et al. |
| 2017/0116259 A1 | 4/2017 | Elliot et al. |
| 2017/0195265 A1 | 7/2017 | Billi et al. |
| 2017/0270362 A1 | 9/2017 | Barnehama et al. |
| 2017/0300753 A1 | 10/2017 | Billi et al. |
| 2017/0337352 A1 | 11/2017 | Williams |
| 2018/0054432 A1 | 2/2018 | Bailey et al. |

FOREIGN PATENT DOCUMENTS

| | | |
|---|---|---|
| EP | 1906289 | 4/2008 |
| EP | 2077473 | 7/2009 |
| EP | 2592812 | 5/2013 |
| EP | 2801935 | 11/2014 |
| EP | 2 927 854 A1 | 10/2015 |
| EP | 2 942 717 A1 | 11/2015 |
| EP | 2940544 | 11/2015 |
| EP | 3 018 597 A1 | 5/2016 |
| EP | 3 037 901 A2 | 6/2016 |
| EP | 3032480 | 6/2016 |
| JP | 2008-201101 A | 9/2008 |
| JP | 2016-010145 A | 1/2016 |
| WO | 2016/057386 A1 | 4/2016 |

OTHER PUBLICATIONS

Office Action for U.S. Appl. No. 15/241,354 dated Jan. 24, 2018, 95 pages.

Microsoft HoloLens demo onstage at BUILD 201, https://www.youtube.com/watch?v=3AADEqLIALk, 2 pages.

European Office Action for EP Patent Application Serial No. 16196582.7, dated Feb. 14, 2018, 7 pages.

European Office Action for EP Patent Application Serial No. 171500853, dated Dec. 19, 2017, 5 pages.

(56) References Cited

OTHER PUBLICATIONS

Extended European Search Report for EP Patent Application Serial No. 17178555.3 dated Jan. 8, 2018, 73 pages.
Extended European Search Report for EP Patent Application Serial No. 17150085.3-1802 dated May 10, 2017, 8 pages.
Non-Final Office Action for U.S. Appl. No. 14/675,129, dated May 4, 2017, 58 pages.
Non-Final Office Action for U.S. Appl. No. 15/391,213, dated May 9, 2018, 79 pages.
Communication pursuant to Rule 69 EPC for EP Patent Application Serial No. 17186540.5 dated Apr. 4, 2018, 2 pages.
Communication pursuant to Rule 69 EPC for EP Patent Application Serial No. 17178556.1 dated Feb. 26, 2018, 2 pages.
Communication pursuant to Rule 69 EPC for EP Patent Application Serial No. 17178555.3 dated Feb. 26, 2018, 2 pages.
Extended European Search Report for European Application Serial No. 17200575.3 dated Apr. 17, 2018, 8 pages.
Extended European Search Report for European Application Serial No. 17200580.3 dated Apr. 17, 2018, 8 pages.
Chinese Office Action for Chinese Application Serial No. 201610187424.2 dated Mar. 9, 2018, 6 pages.
Communication Pursuant to Article 94(3) EPC Received for EP Patent Application No. 16161305.4 dated Sep. 8, 2017, 7 pages.
Extended European Search Report for EP Patent Application Serial No. 17178556.1-1871 dated Aug. 23, 2017, 10 pages.
Extended European Search Report for EP Patent Application Serial No. 17186540.5-1958 dated Sep. 28, 2017, 8 pages.
European Office Action for EP Patent Application Serial No. 16196582.7, dated May 9, 2017, 2 pages.
Final Office Action for U.S. Appl. No. 14/675,129, dated Dec. 1, 2017, 63 pages.
Office Action for U.S. Appl. No. 14/928,305, dated Dec. 22, 2017, 24 pages.
Rockwell Automation. The Power of Collaboration Working for you: PartnerNetwork Solutions from Rockwell Automation; Win-911 Software; Publication ENCOMP-BR007B-EN-P—Dec. 2013.
Extended European Search Report for European Application Serial No. 17200391.5 dated Jan. 18, 2018, 7 pages.
Extended European Search Report for EP Patent Application Serial No. 16161305.4, dated Sep. 5, 2016, 10 pages.
European Office Action for EP Patent Application Serial No. 16161305.4, dated Oct. 10, 2016, 2 pages.
Non-Final Office Action received for U.S. Appl. No. 15/170,676, dated May 24, 2018, 163 pages.
Communication pursuant to Rule 69 EPC for EP Patent Application Serial No. 17200575.3 dated May 22, 2018, 2 pages.
Communication pursuant to Rule 69 EPC for EP Patent Application Serial No. 17200580.3 dated May 22, 2018, 2 pages.
Non-Final Office Action received for U.S. Appl. No. 14/987,399 dated Jun. 1, 2018, 83 pages.
Final Office Action received for U.S. Appl. No. 14/928,305 dated Jun. 5, 2018, 16 pages.
Final Office Action received for U.S. Appl. No. 15/241,354, dated Jul. 11, 2018, 80 pages.
Final Office Action for U.S. Appl. No. 15/391,213, dated Oct. 25, 2018, 67 pages.
Non-Final Office Action for U.S. Appl. No. 14/928,305, dated Dec. 31, 2018, 19 pages.
Non-Final Office Action for U.S. Appl. No. 15/391,260, dated Nov. 30, 2018, 78 pages.
Final Office Action received for U.S. Appl. No. 15/170,676, dated Dec. 26, 2018, 46 pages.
Non-Final Office Action for U.S. Appl. No. 15/718,907, dated Dec. 14, 2018, 75 pages.
Chinese Second Office Action for Chinese Application Serial No. 201610187424.2 dated Sep. 4, 2018, 11 pages (Including English Translation).
Non-Final Office Action for U.S. Appl. No. 15/465,246 dated Jan. 24, 2019, 411 pages.
Communication pursuant to Rule 94(3) EPC for EP Patent Application Serial No. 17186540.5 dated Feb. 21, 2019, 5 pages.
Non-Final Office Action for U.S. Application U.S. Appl. No. 15/718,856 dated Mar. 05, 2019, 68 pp.

* cited by examiner

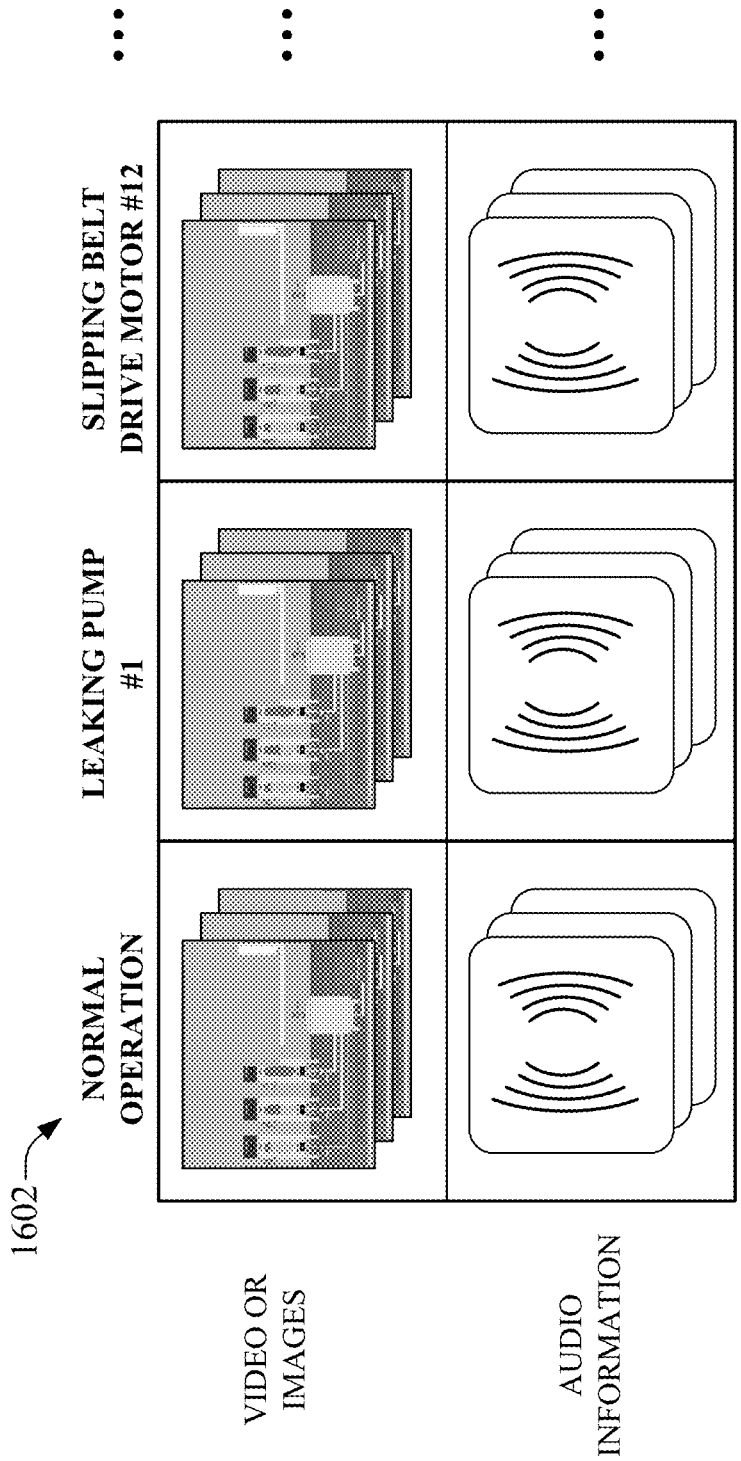

MULTIMODAL SEARCH INPUT FOR AN INDUSTRIAL SEARCH PLATFORM

BACKGROUND

The subject matter disclosed herein relates generally to industrial automation systems, and, for example, to identification and diagnosis of industrial performance issues.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for facilitating diagnosis of industrial performance issues is provided, comprising a transform component configured to receive multimedia data captured by a client device, and tag the multimedia data with contextual information identifying an automation system represented by the multimedia data; and an indexing component configured to index the multimedia data in a federated data model of an industrial enterprise in association with the automation system based on the contextual information.

Also, one or more embodiments provide a method for identifying industrial performance issues based on multimedia information, comprising receiving, by a system comprising at least one processor, multimedia data recorded by a client device; tagging, by the system, the multimedia data with contextual information identifying an automation system represented by the multimedia data; and indexing, by the system and based on the contextual information, the multimedia data in a federated data model of an industrial enterprise in association with the automation system.

Also, according to one or more embodiments, a non-transitory computer-readable medium is provided having stored thereon instructions that, in response to execution, cause a system to perform operations, the operations, comprising receiving multimedia data recorded by a client device; appending contextual information to the multimedia data, the contextual information identifying an automation system represented by the multimedia data; and indexing, based on the contextual information, the multimedia data in a federated data model of an industrial enterprise in association with the automation system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 16 is a representation of an example categorization for reference multimedia information that can be maintained by the search and diagnosis system.

DETAILED DESCRIPTION

Figure 1:
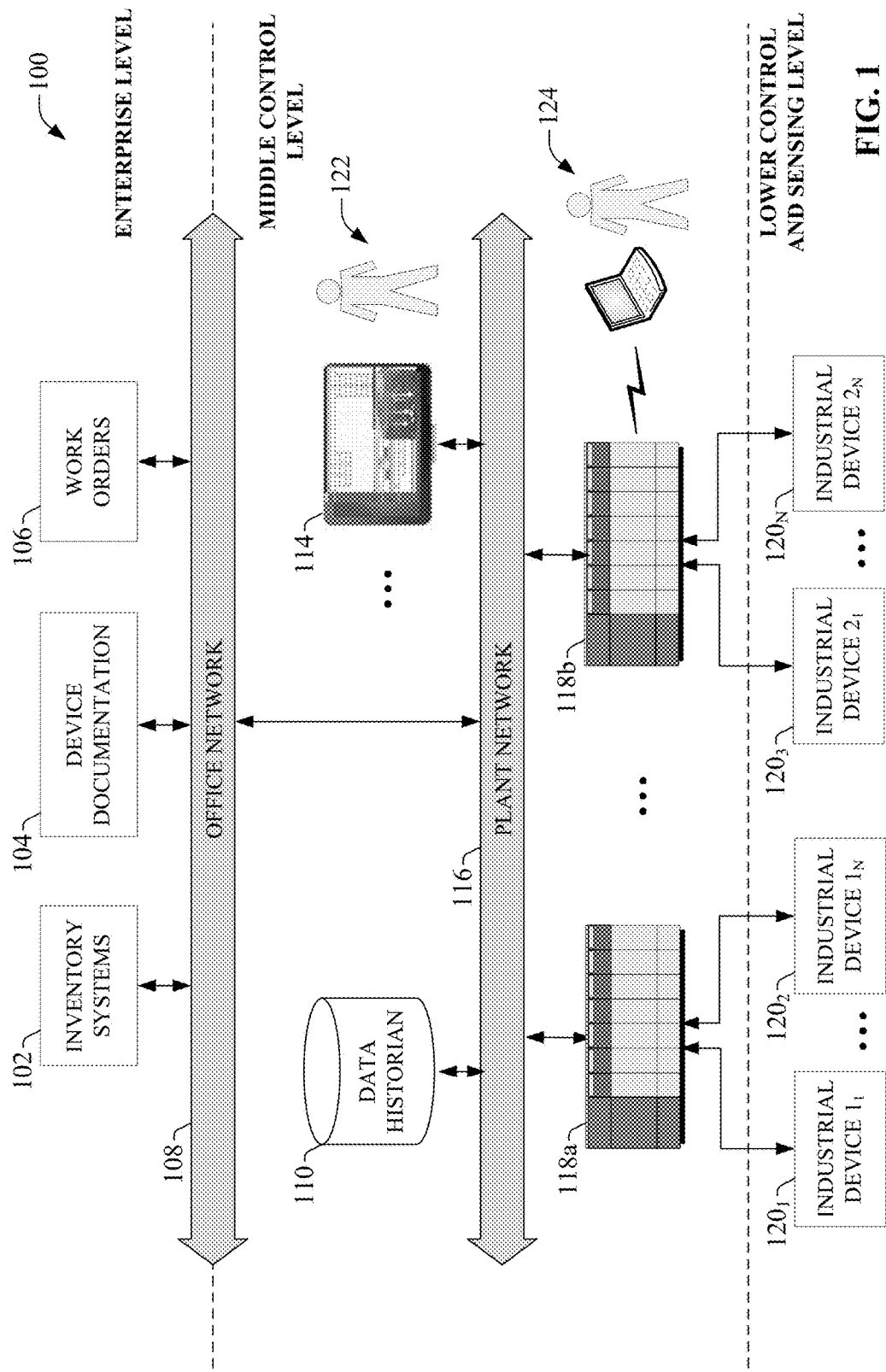
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Industrial controllers 118 and HMIs 114 comprise two sources of information relating to the industrial processes and systems being controlled within the plant environment. Since HMIs 114 leverage data from industrial controllers 118 (or read directly from controlled industrial devices or other I/O devices in some scenarios) to facilitate visualization of the controlled systems, both the industrial controllers 118 and the HMIs 114 may contain information relating a common aspect of the industrial systems. For example, the control programming (e.g., ladder logic, sequential function chart, etc.) for controlling operation of a particular tank used in a batch process may execute on one of the industrial controllers 118, while the operator interface screens for viewing a graphical representation of the tank's current status and relevant setpoints (e.g., level setpoints, maximum flow setpoints, etc.) may be viewed on one of the HMIs 114. However, since these two sources of information are segregated cross two different data sources and platforms, operators and maintenance personnel are typically only able to view one source of information at a time. That is, operators may choose to view the operator interface screens for the tank of interest on the relevant HMI terminal (see operator 122), or may connect a personal computing device (e.g., a laptop or tablet computer) to the industrial controller to view the control programming used to control the tank's operation (see operator 124). In most cases, the operator must be in physical proximity to either the HMI terminal or the industrial controller in order to view the information on that particular data source. Consequently, during troubleshooting of maintenance issues involving the tank, personnel must travel to the source of the information (e.g., the HMI terminal or industrial controller, which are often located near the physical machine being controlled) and locally search each of the HMI and the industrial controller individually.

Some industrial environments may also include other sources of potentially relevant information relating to specific aspects of the controlled industrial systems. These may include, for example, a data historian 110 that aggregates and stores production information collected from the industrial controllers 118 or other data sources, or a device documentation store 104 containing electronic documentation for the various industrial devices making up the controlled industrial systems. Other information sources may include an inventory tracking system 102, a work order management system 106, repositories for machine or process drawings and documentation, vendor product documentation storage, vendor knowledgebases, internal knowledgebases, or other such systems, some or all of which may reside on an office network 108 of the industrial environment. These diverse information sources are spread across many locations and systems both within the plant environment and externally (e.g., on the Internet). When diagnosing problems, maintenance personnel are often required to search several of these sources of information individually, using several different software packages specific to the respective data sources being searched. Moreover, searching for information pertaining to a particular device or machine often requires an extensive knowledge of the overall industrial system in order to locate the data source (e.g., industrial controllers, HMIs, etc.), to be searched, as well as to identify the relevant operator screens and control program routines. Individually searching each of these data sources in connection with solving a system downtime issue or other problem can delay correction of maintenance issues, resulting in lost revenue and scheduling problems.

Adding to these maintenance difficulties, employee turnaround often results in a failure to retain knowledge of the particular equipment and systems at a given plant. For example, experience maintenance personnel often learn to diagnose performance issues on a particular automation system based on characteristic visual or audio queues (e.g., a tell-tale noise indicative of a slipping drive belt, a leaky pump discovered through visual inspection, etc.). When such experienced maintenance personnel retire or relocate to another facility, the knowledge gained by these employees through their experiences in dealing with the idiosyncrasies of the equipment in use at the facility is no longer available. New employees with little or no experience in addressing the particular needs of the plant's equipment may spend a considerable amount of time relearning the visual and audio characteristics that lead to accurate diagnosis of the plant's industrial systems, machinery, and other equipment.

To address these and other issues, one or more embodiments of the present disclosure provide a multi-platform industrial search and diagnosis system that discovers available data items across multiple heterogeneous data platforms that make up an industrial enterprise and indexes the data items in a unified searchable namespace. The system can be a component of a multi-platform industrial search, analysis, and notification system that allows a user to search multiple disparate industrial data platforms for information of interest. The search and diagnosis system unifies plant-wide control system information from multiple diverse sources under a common namespace, or federated data model. The system can also index non-textual input, including but not limited to image data, video data, and audio data. This non-textual, or multimedia, data can be indexed by the system in association with the relevant industrial systems (e.g., machines, automation systems, devices, production lines, etc.) so that the system can provide the multimedia data to the user when the relevant industrial systems are searched or invoked.

The system can also accept non-textual or multimedia data from the user's client devices as search criteria. For example, a user may record visual or audio information for a machine and submit this multimedia information to the search and diagnosis system. The search and diagnosis system can then analyze the submitted multimedia information in view of related information indexed in the federated data model. This may include, for example, comparing the audio or visual information with baseline visual or audio data previously recorded for the machine and identifying a performance issue based on a result of the comparison. The system can then provide the user with information identifying the issue, as well as possible countermeasure information to assist the user in correcting the issue. Other features supported by the system will be described in more detail below.

Figure 2:
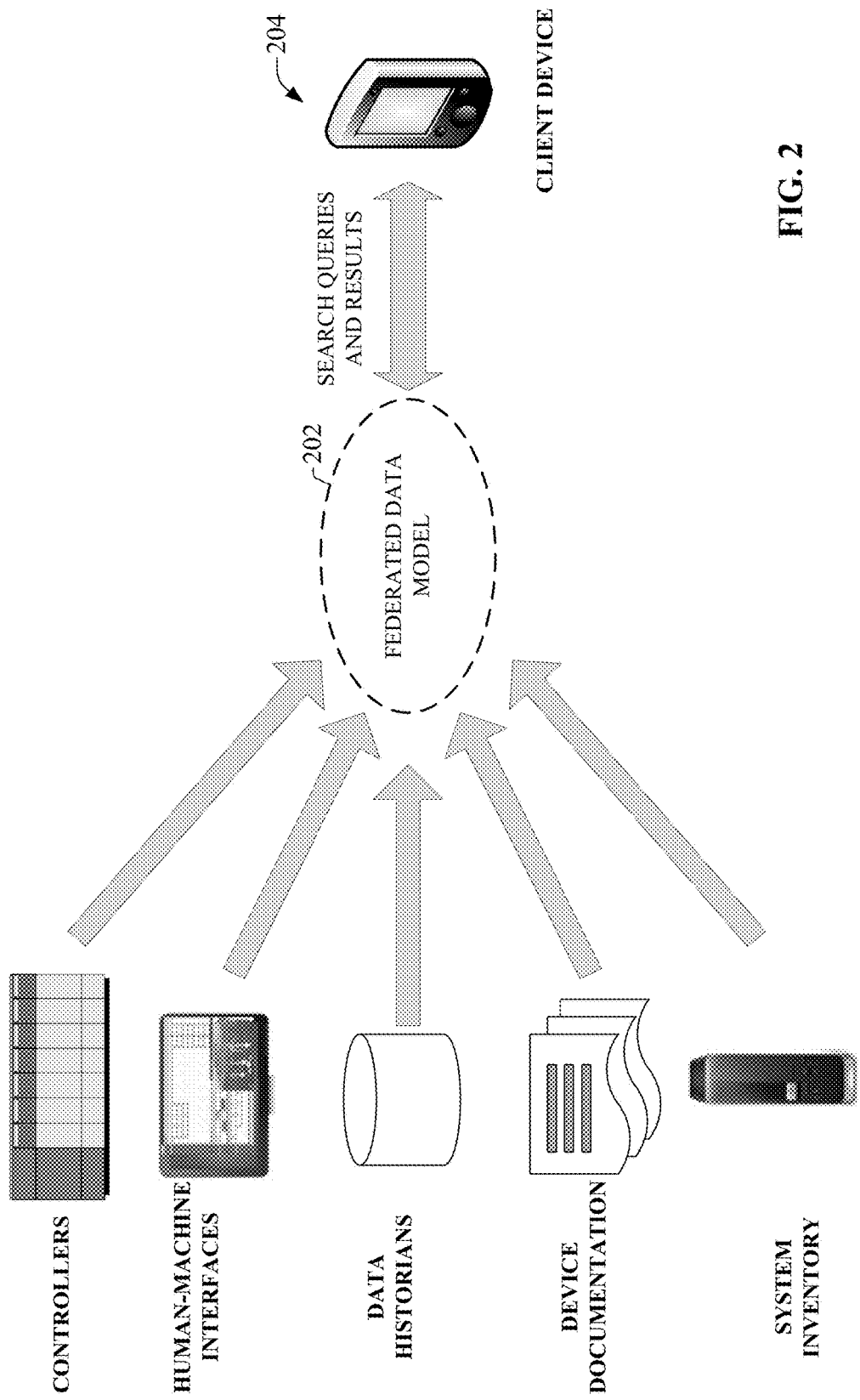
FIG. 2 is a conceptual diagram illustrating industrial data federation.

As noted above, the search and diagnosis system can unify control system information from a variety of sources under a common namespace or federated data model. FIG. 2 is a conceptual diagram illustrating such industrial data federation. In one or more embodiments, the search and diagnosis system indexes data from multiple sources both across the industrial facility and external to the facility, including but not limited to industrial controllers, HMIs, intelligent industrial devices, data historians, device and system documentation repositories (e.g., drawings, manuals, knowledgebase articles, etc.), system inventory management systems, computer-based control applications (e.g., enterprise resource planning systems, batch process management systems, etc.), batch software, product control software, structured query language (SQL) databases that interact with the control system, and/or other such platforms. The system indexes and correlates this multi-platform data to yield a federated data model 202 that can be accessed and searched by a client device 204, or analyzed by automated monitoring tools to identify operational issues and possible countermeasures for addressing such issues.

In an example search scenario, client device 204 may submit a search request for a particular data tag (e.g., Tank1) to the federated data model 202. Based on the indexed plant-wide information recorded in the model, the industrial search system can locate all instances of the specified data tag across the disparate data sources and deliver a list of all discovered instances categorized according to data platform. For example, the search system may provide a categorized search result list that includes a first list of discovered references to the data tag in one or more industrial control programs (e.g., ladder logic, sequential function charts, etc.), and a second list of discovered instances of the data tag being displayed on one or more HMI screens. In response to selection of a search result in the industrial controller list result, the search system remotely launches an instance of the appropriate controller development application on the client device and navigates to the portion of the control program (e.g., a ladder logic rung) corresponding to the selected instance. Likewise, selection of a search result in the HMI result list causes the search system to launch a runtime instance of the HMI visualization application on the client device, and to navigate to the display screen corresponding to the selected instance.

Figure 3:
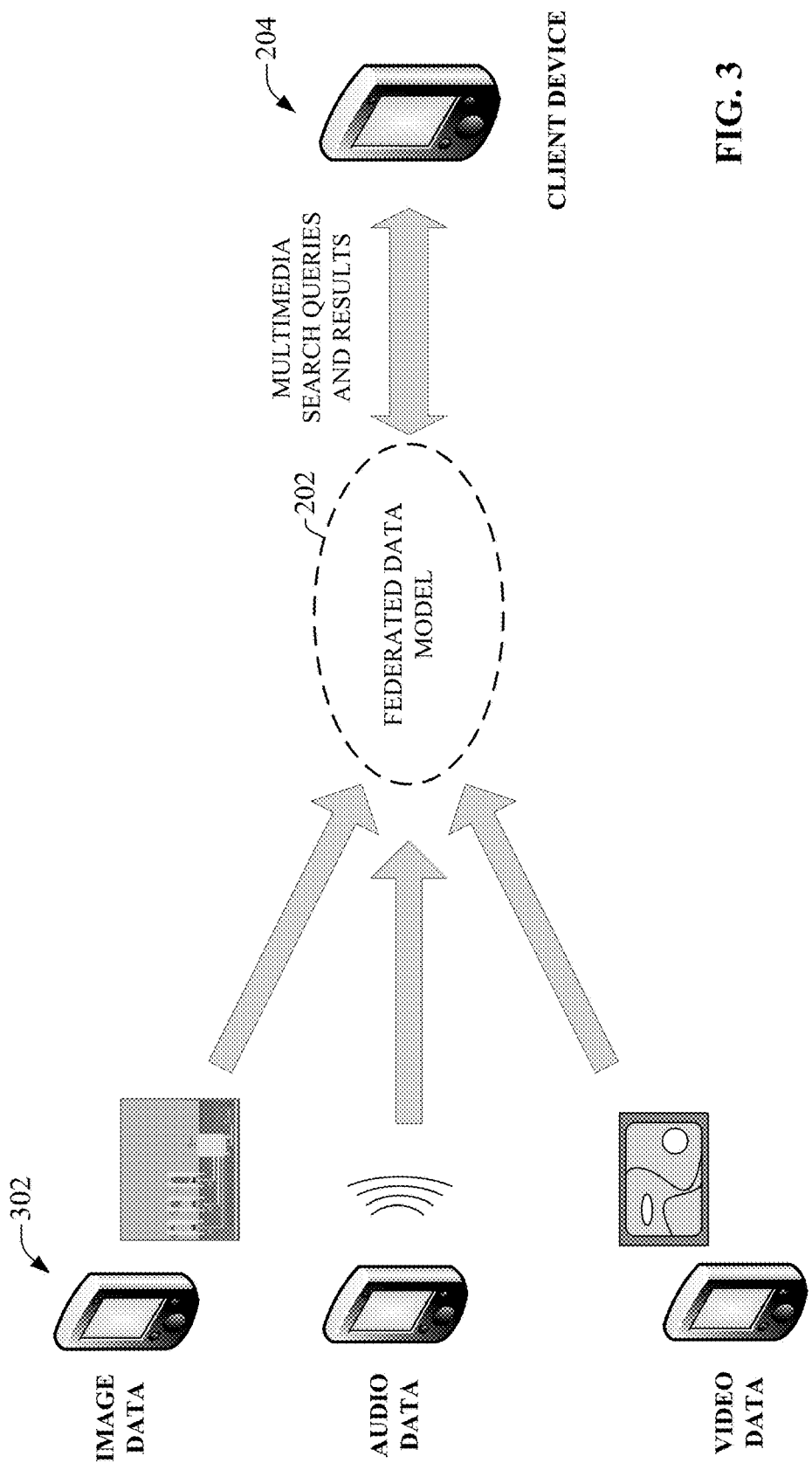
FIG. 3 is a conceptual diagram illustrating indexing of multimedia data in a federated data model.

In addition to the types of industrial data described above (e.g., device identification and configuration information, controller program information, data tag usages, documents, reports, etc.), the search and diagnosis system can also support multimedia information, both as information to be indexed into federated data model 202 and as search criteria to be submitted to the model. FIG. 3 is a conceptual diagram illustrating federation of such multimedia data. As shown in this figure, client devices 302 can submit image data (e.g., digital photographs), audio data, and video data to the system for indexing in the federated data model 202. Using various techniques to be described below, the system indexes each item of multimedia data in association with one or more relevant automation systems (e.g., devices, machines, equipment, production lines, work areas, etc.) so that the multimedia data can be presented to a user when information about those automation systems is requested. In addition, a client device 204 can submit image, audio, and/or video data to the system as search or analysis criteria. The system can analyze this submitted multimedia information in view of data model 202 and, based on results of the analysis, generate corresponding search results, identify operational issues based on information obtained from the submitted audio/visual information, generate recommendation information identifying possible countermeasures for addressing the identified issues, or other such functions.

The discovery and indexing system can build and maintain federated data model 202 automatically or semi-automatically in a number of ways. In some embodiments, the system can deploy a discovery agent on the plant network. The discovery agent may comprise, for example, a software script that crawls the network to discover industrial devices and other data sources—both internal to the plant as well as external sources—containing available data items. The discovery agent can report the discovered data items to the discovery and indexing system, which converts the data to a common searchable format, contextualizes the data using predefined or automatically generated tags, identifies any interdependencies between the data items, and indexes the data in the federated data model for subsequent searching. In another scenario, some industrial devices compatible with the indexing system may push information regarding their available data items to the system for tagging and indexing.

Figure 4:
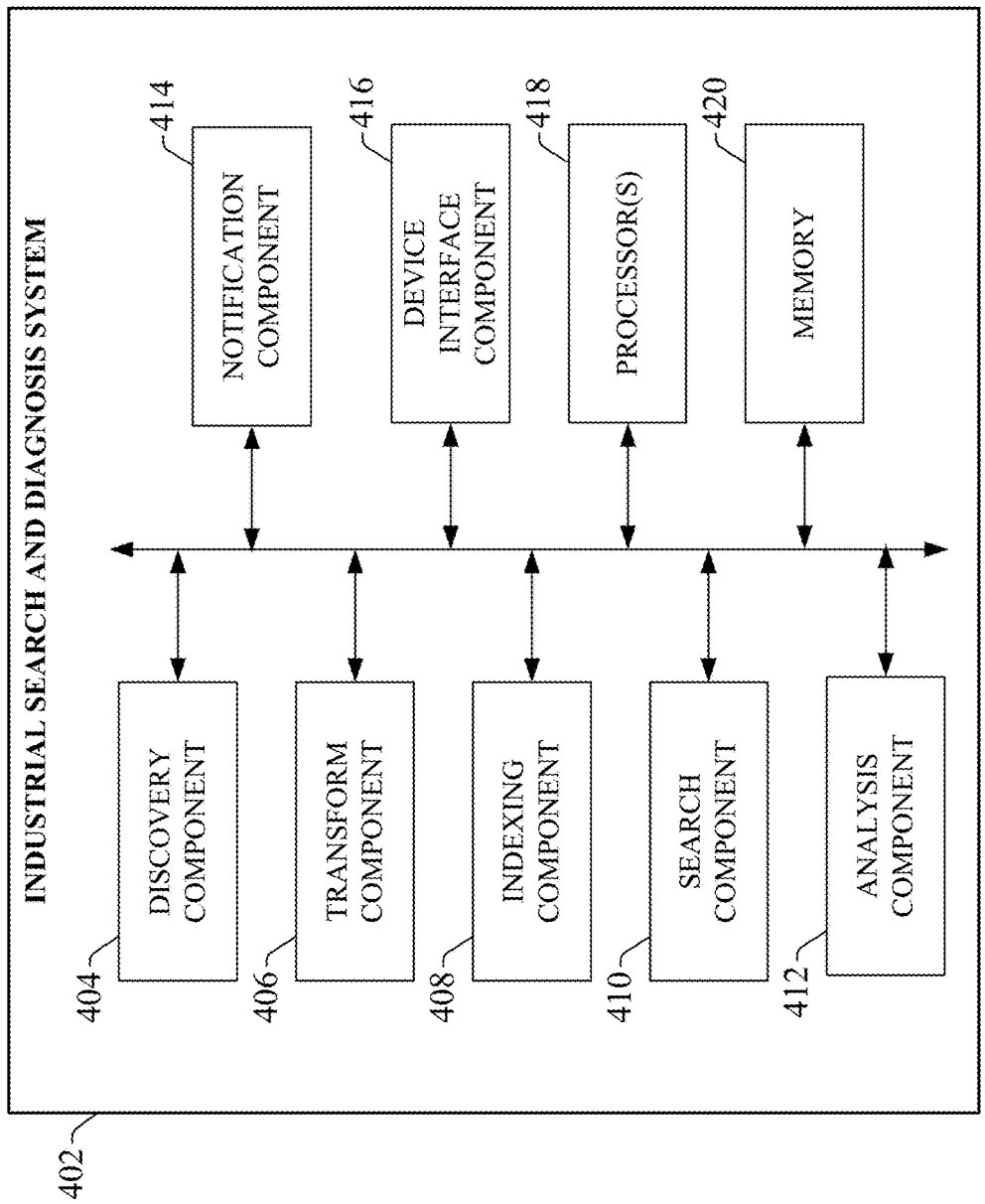
FIG. 4 is a block diagram of an example industrial search and diagnosis system.

FIG. 4 is a block diagram of an example industrial search and diagnosis system 402 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial search and diagnosis system 402 can include a discovery component 404, a transform component 406, an indexing component 408, a search component 410, an analysis component 412, a notification component 414, a device interface component 416, one or more processors 418, and memory 420. In various embodiments, one or more of the discovery component 404, transform component 406, indexing component 408, search component 410, analysis component 412, device interface component 416, the one or more processors 418, and memory 420 can be electrically and/or communicatively coupled to one another to perform one or more of the functions of the industrial search and diagnosis system 402. In some embodiments, components 404, 406, 408, 410, 412, 414, and 416 can comprise software instructions stored on memory 420 and executed by processor(s) 418. Industrial search and diagnosis system 402 may also interact with other hardware and/or software components not depicted in FIG. 4. For example, processor(s) 418 may interact with one or more external user interface devices, such as a keyboard, a mouse, a display monitor, a touchscreen, or other such interface devices.

Discovery component 404 can be configured to gather information from one or more industrial automation devices and other data sources both internal and external to an industrial environment. Information gathered by the discovery component can include, but is not limited to, industrial device identification and configuration data, device programming, historical data, networking information, device documentation, product inventory information, audio and/or visual information submitted by one or more client devices, troubleshooting information from device vendors' technical support web pages, etc. The discovery component 404 can also be configured to discover interdependencies between the data items. Transform component 406 can be configured to transform and tag the data discovered by or submitted to the discovery component 404 prior to indexing. This can include, for example, transforming heterogeneous data items discovered on different types of data platforms to a homogeneous format for indexing under a common namespace, tagging the discovered data with relevant contextual information—e.g., a plant, production area, machine, or device on which the data was discovered; geotag information; a relationship or interdependency between a given data item and another data item; a data platform corresponding to the data item (e.g., industrial control program, HMI application, knowledgebase article, device documentation, etc.)—or other data modifications.

The indexing component 408 can be configured to generate a federated data model (e.g., federated data model 202) defining locations and sources of data items throughout the industrial system, as well as relationships between the data items, based on the discovered and transformed data. The resulting federated data model is capable of identifying and reporting sources of specific data items or tags, as well as relevant contextual data relating to a specified data item.

Search component 410 can be configured to submit search queries to the federated data model and retrieve search results identifying locations of requested data items throughout the industrial system. In some embodiments, search component 410 can be configured to classify the search results according to the platform of the respective data sources on which the results were found (e.g., control logic, HMI, etc.), as well as the network and/or physical location (e.g., production area) in which the information is located. For search results corresponding to web content (e.g., vendor knowledgebase websites), the search component 410 can generate links that facilitate direct navigation to the web content.

Analysis component 412 can be configured to perform analysis on the federated data model generated and maintained by indexing component 408. The analysis component 412 can support various types of analysis that facilitate identification of operational issues on the industrial systems monitored by the system 402, determination of possible corrective measures to mitigate the discovered issues, and notification of the appropriate plant personnel in response to discovery of such issues. Notification component 414 can be configured to identify suitable plant personnel for notification of a discovered issue, and to send notification data to client devices associated with the identified plant personnel. The notifications may identify the issue and the affected automation systems or devices, as well as possible countermeasures or workflows for correcting the issue.

Device interface component 416 can be configured to exchange information between the industrial search and diagnosis system 402 and a client device having authorization to access the system. For example, the device interface component 416 can receive search queries from the client device for submission to the federated data model, as well as deliver search results and notifications to the client device.

The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

Figure 5:
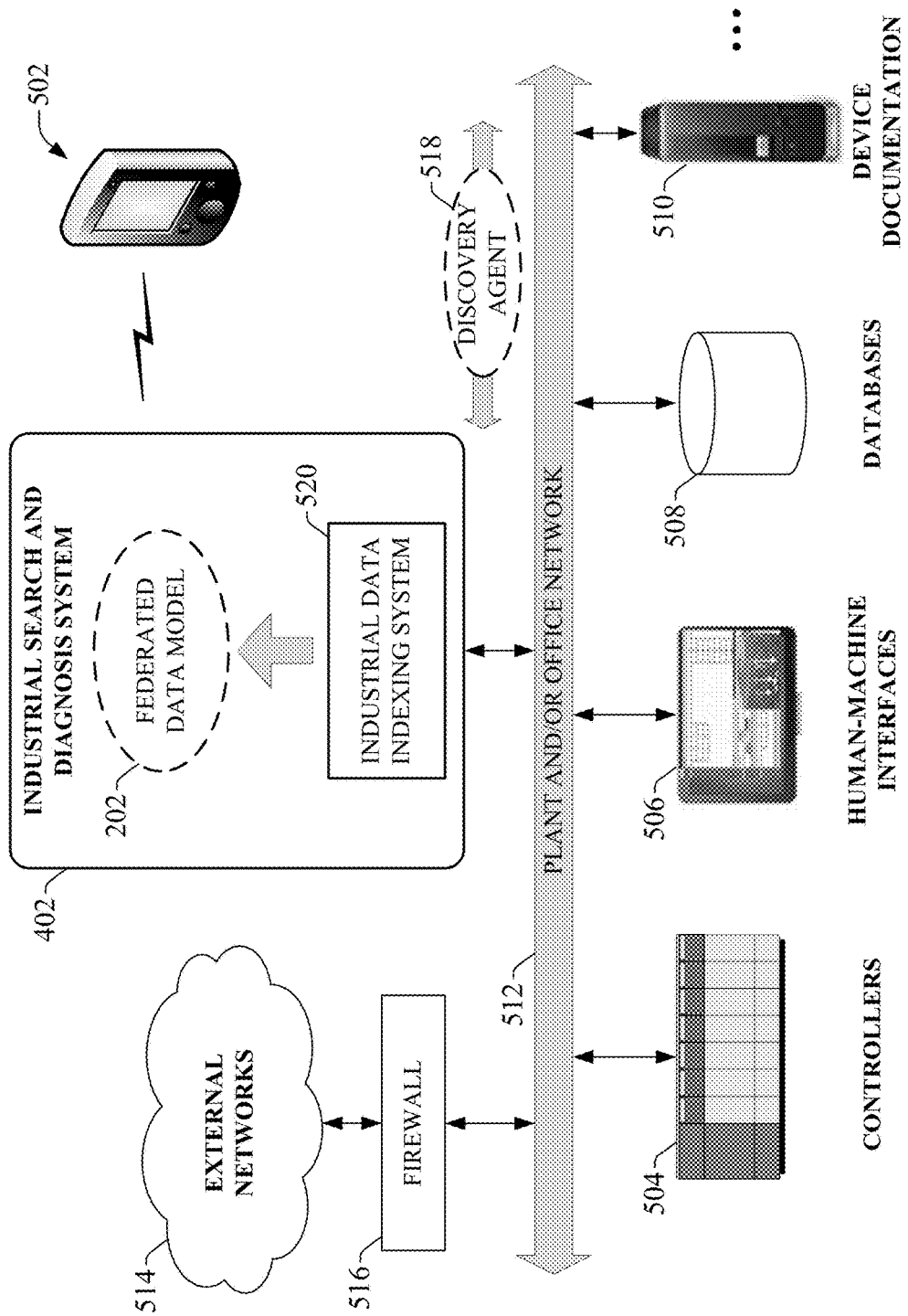
FIG. 5 is a block diagram of a generalized example architecture including an industrial search and analysis system that discovers and indexes multi-platform data throughout an industrial environment.

FIG. 5 is a block diagram of a generalized example architecture including an industrial search and diagnosis system 402 that discovers and indexes multi-platform data throughout an industrial environment. The example industrial environment depicted in FIG. 5 includes one or more industrial controllers 504, HMIs 506, databases 508 (e.g., data historians, employee databases, inventory databases, etc.), and device documentation repositories 510. The industrial environment may also include other sources of industrial data not depicted in FIG. 5, including but not limited to product inventory tracking systems, work order management systems, etc. Data sources 504-510 reside on a plant and/or office network 512. In some scenarios, data sources 504-510 may be distributed across multiple networks within the plant facility; e.g., a plant network and an office network communicatively connected through a firewall device or other network infrastructure device. Network 512 may also have access to external networks 514 such as the Internet (e.g., via firewall 516).

Industrial data indexing system 520—which includes the discovery component 404, transform component 406, and indexing component 408—discovers and indexes data items that are available in the disparate data sources 504-510 as well as on the external networks 514. Industrial data indexing system 520 also indexes relationships between the data items. This can include, for example, recording instances of the same data item residing in multiple data sources (e.g., recording that a data tag corresponding to a particular temperature measurement within one of the industrial controllers 504 corresponds to a data tag within one of the HMIs 506 for displaying the temperature measurement on a display screen), observing that values of certain data items are a function of other data items (e.g., an output coil associated with a first data tag in a ladder logic program is set based on a value of a second data tag used as an output condition for the rung), or other such relationships.

To facilitate discovery and indexing, the industrial data indexing system 520 can deploy a discovery agent 518 on the plant network 512, which traverses the network and discovers data sources (e.g., industrial devices, knowledge bases, device documentation storage devices, work schedules, maintenance record databases, electronic communication records, etc.) and the data items available on each data source. In some embodiments, the discovery agent 518 can also traverse external networks 514 to discover relevant external sources of data, including but not limited to vendor websites or knowledgebases. The discover agent 518 can return information describing the discovered data to the industrial data indexing system 520 for processing and indexing within the federated data model. In this way, the industrial data indexing system 520 automatically inventories a customer's industrial environment by discovering the industrial assets in use and their associated available data items. Industrial data indexing system 520 can also discover relevant data on data sources residing on the external networks 514, including but not limited to device or machine vendor documentation, relevant online knowledgebase articles, vendor product release information, etc.

Industrial data indexing system 520 records the indexed information (that is, the discovered plant-wide data items and their relationships) as a federated data model 202, which can be remotely accessed and searched by a client device 502 to locate desired data items. Client device 502 can be any mobile device (e.g., mobile phone, laptop computer, tablet computer, wearable computer, etc.) or fixed location computer (e.g., desktop computer, server, operator interface, etc.) capable of remotely accessing search and diagnosis system 402. In some embodiments, industrial search and diagnosis system 402 may be implemented on a web server, allowing client device 52 to access the federated data model via an Internet connection. The search and diagnosis system 402 may also be implemented on a networked local server accessible by the client device 502 via a wireless network connection. In yet another scenario, the search and diagnosis system 402 may be implemented on a cloud platform, where the search system executes as a cloud-based service.

Figure 6:
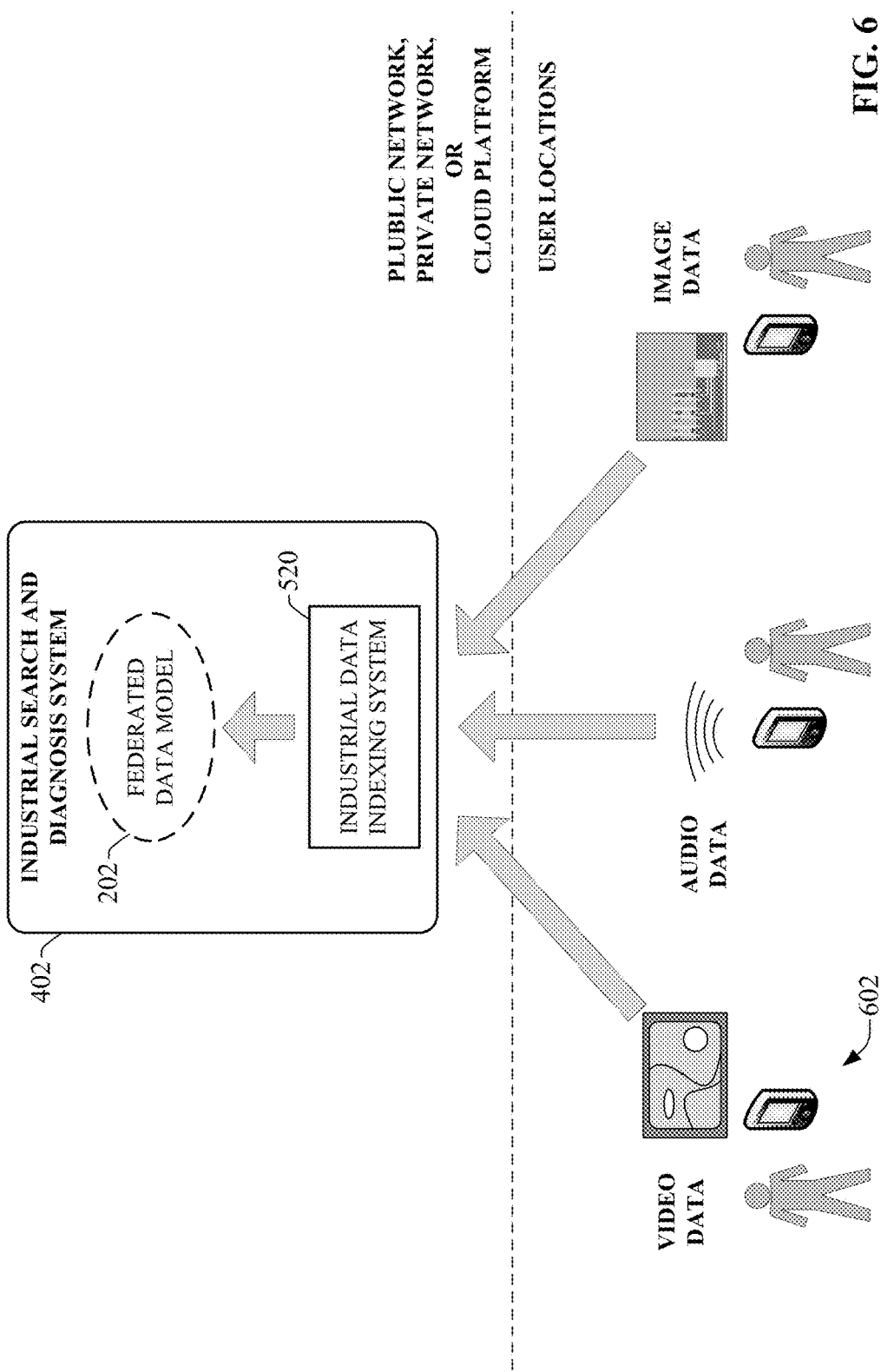
FIG. 6 is a block diagram illustrating submission of such multimedia data for indexing.

In addition to indexing the data from data sources 504-510, indexing system 520 can also receive and index multimedia data submitted by one or more users via the users' client devices. FIG. 6 is a block diagram illustrating submission of such multimedia data for indexing. Multimedia information captured by client devices 602—including but not limited to video, audio, and/or digital image data—can be submitted to the indexing system 520 of the search and diagnosis system 402, which indexes the submitted multimedia data in the federated data model 202. Examples of such multimedia data can include, for example, images or video of automation systems or machines to be indexed for baseline comparison or reference purposes, recorded audio of running machines, voice messages recorded by plant personnel for association with a particular machine or automation system, or other such data.

Figure 7:
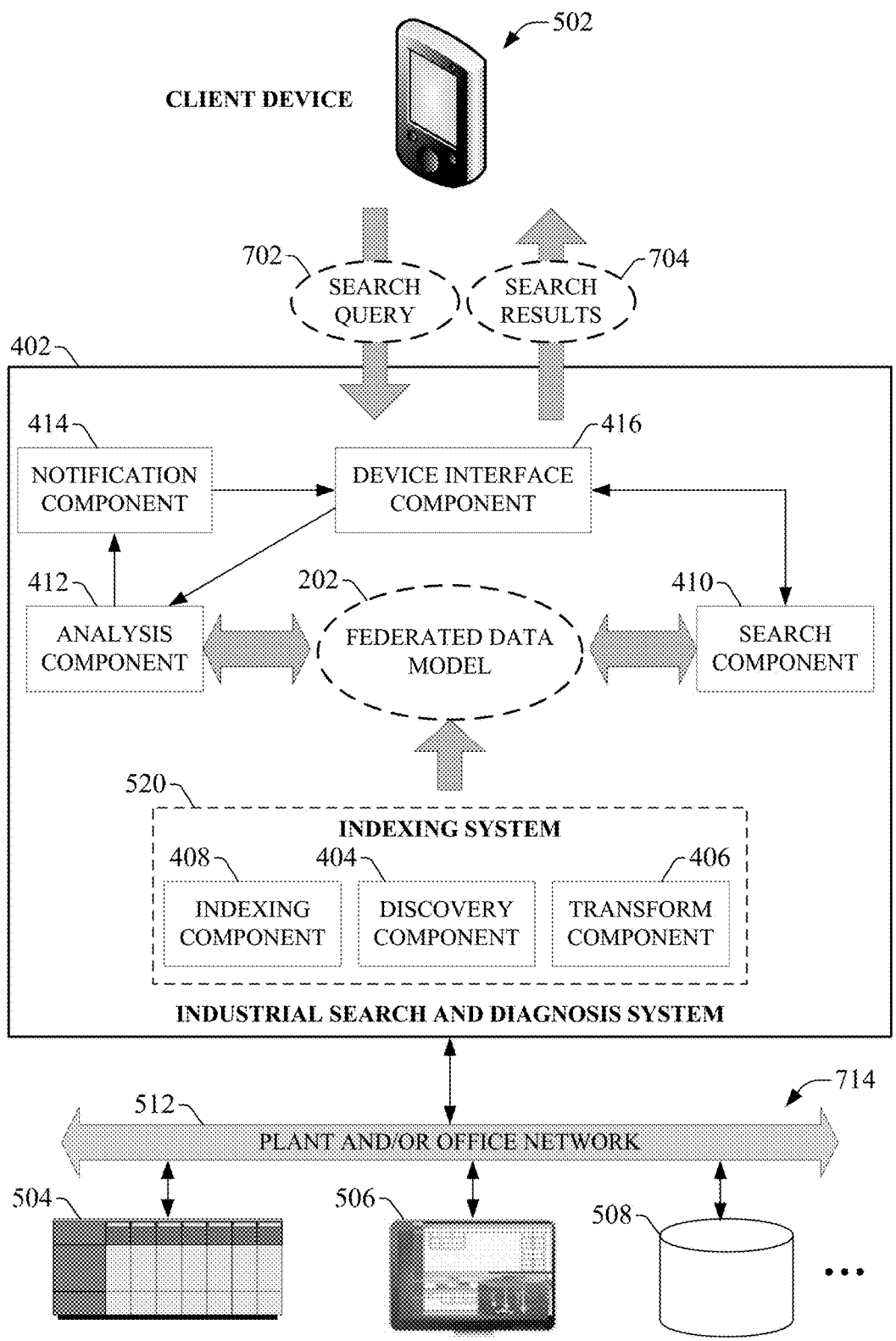
FIG. 7 is a block diagram illustrating components of the industrial search and diagnosis system.

System 402 allows searches to be submitted to the federated data model 202, and also includes analysis tools that can analyze data model 202 to identify performance or operational issues relating to the industrial systems represented by the data model 202. Returning now to FIG. 5, in an example search scenario, client device 502 may submit a search query for a particular data item (e.g., a data tag name) to the search and diagnosis system 402, which initiates a search of the federated data model 202 to facilitate location of the specified data item. The system 402 then returns a list of search results to the client device 502 identifying all discovered locations of the data item across the various data sources 504-510. The system can classify the results according to type of data source (e.g., data platform) in which the result was found. In some embodiments, the system can also classify the results according to location within the plant environment (e.g. production line, workcell, etc.). For example, the results may include a first list of controller logic results identifying control logic rungs on which the desired data item is referenced, and a second list of HMI screen results identifying HMI screens on which the desired data item is displayed. When a search result is selected at the client device 502, the search system can also remotely launch the appropriate platform-specific application for viewing the selected result (e.g., an HMI viewer, a control logic viewing/development environment, an electronic document reader, etc.). Examples of diagnostic analysis of the federated data model will be described in more detail below FIG. 7 is a block diagram illustrating components of the industrial search and diagnosis system 402 in more detail. In some embodiments, the search and diagnosis system may be implemented on a server or other computing device that resides on plant and/or office network 512. In other embodiments, the search and diagnosis system 402 may be implemented on a web server, allowing client devices to remotely search the federated data model 202 via a web connection. In still other embodiments, the search and diagnosis system may be implemented as a cloud-based service that executes on a cloud platform, as will be discussed in more detail herein.

Indexing system 520—comprising discovery component 404, transform component 406, and indexing component 408—collects information about available data items distributed across a customer's industrial environment, and generates federated data model 202 representing a searchable unified view of the discovered data. The indexing system 520 is configured to discover data items on multiple disparate platforms, including but not limited to industrial controllers 504, HMIs 506, databases 508, electronic documentation libraries, inventory tracking systems, work order management systems, etc. As will be described in more detail herein, the indexing system 520 can discover available data items by deploying discovery agents 518 on network 512. These agents traverse network 512 and identify devices in use throughout the plant, as well as the data items or tags, applications, and configuration information associated with those devices. Since a given industrial environment typically comprises a heterogeneous collection of devices of different types and vendors, and the data made available by these devices may comprise many different data types (e.g., controller tags, HMI tags, alarms, notifications, events, data values, tabular data, logs, configuration settings, diagnostic values, alarms, HTML pages, etc.), indexing system 520 can manage and deploy device-specific or platform-specific agents configured to extract and analyze information from specific types of devices or data platforms (e.g., controllers, HMIs, etc.). Some device-specific discovery agents can be configured to locate application project files stored on particular device types (e.g., configuration and/or program files on an industrial controller, screen configuration files on an HMI, etc.), and extract relevant information about the devices based on analysis of data contained in these project files. By leveraging device-specific and platform-specific agents, the indexing system 520 can discover and index data conforming to many different formats and platforms.

In order to unify this disparate heterogeneous data under a common platform for collective searching, the discovery agents can transform the collected data to a format understandable by the indexing system 520 (e.g., extensible markup language or other format), and the indexing system 520 can index this transformed data using a common indexing format compatible with the common search platform. The indexing system 520 then encodes this normalized representation of the discovered data in the federated data model 202. By unifying the distributed data under this unified search platform, the system can allow client devices to search the plant-wide data without knowledge of the rules or protocols for reading the various data source platforms (e.g., industrial controllers, HMIs, etc.). In addition to discovery of devices and their associated data via discovery agents deployed on the plant network, some embodiments of indexing system 520 can also be configured to receive uploaded configuration information from devices that support self-identification functionality, as well as to receive multimedia data from client devices or wearable computers. Both of these scenarios will be described in more detail herein.

Indexing system 520 can also discover and record relationships—both explicit and inferred—between discovered data items. In some embodiments, the indexing system 520 may record these relationships by tagging discovered data items and building the search index based on these tags, such that related data items share common tags. In some scenarios, these tags may be explicitly defined by a system developer such that the indexing component 408 determines which predefined tags should be applied to newly discovered data items.

In a similar fashion, when multimedia data (e.g., an audio file, a video or photographic file, etc.) is submitted to the indexing system 520 to be indexed, the indexing system 520 can determine one or more relationships between the multimedia data and one or more other data items indexed within data model 202. This may include, for example, associating the multimedia data with a group of data items associated with a particular automation system, machine, or production line to which the multimedia data pertains, and recording this relationship in the federated data model 202.

Using some or all of these techniques, the indexing system 520 can automatically build a model of the customer's industrial environment, including the disparate and multi-platform devices in use throughout the plant, their associated available data items, and relationships between these data items. This eliminates the need for plant personnel to have full knowledge of the industrial assets in use throughout the plant, since indexing system 520 can automatically inventory a given industrial environment and record discovered devices and data in federated data model 202.

Once created by the indexing system 520, federated data model 202 can be searched by search component 410 or analyzed by analysis component 412. Search component 410 is configured to search federated data model 202 in response to a search query 702 submitted by a client device 502. Client device 502 can exchange data with the industrial search and diagnosis system 402 via device interface component 416, which may comprise a wired or wireless network interface, a near-field communication interface, or other such device interface suitable for the particular platform on which the search system is implemented. In some embodiments, device interface component 416 may be configured to verify an authorization of the client device 502 to access the search system prior to allowing search queries to be submitted by the client device. The device interface component 416 may authenticate the client device or its owner using password verification, biometric identification, cross-referencing an identifier of the client device with a set of known authorized devices, or other such verification techniques.

In some embodiments, the device interface component 416 may be configured to serve an interface display or dashboard to the client device 502 when the client device requests access to the search and diagnosis system 402. The interface display can include interface elements that allow the user of client device 502 to manually enter and submit a search query 702 to the system 402. For example, the display may allow the user to enter a keyword, term, or phrase as a search criterion. Example search terms may include identifiers of specific devices or machines, names of production areas within the plant, product names or codes, employee names, or other such criteria. In addition to manually entered search criteria, some embodiments of the device interface component 416 can be configured to translate barcodes or Quick response (QR) codes affixed to devices or machines. For example, a user may scan or photograph a barcode or QR code attached to a device, machine, or product (e.g., a pin-stamped or laser-etched barcode affixed to a workpiece during the production process) using client device 502, wherein the barcode contains identification information about the associated component. The client device 502 can then submit identification information extracted from the barcode to the device interface component 416 as a search criterion. In yet another example, client device 502 may extract information about an industrial device or its associated process directly from the device via near field communication (NFC) and submit the extracted information to the device interface component 406. This extracted information can include, but is not limited to, a device identifier, device status information read from a status word maintained on the industrial device, alarm data extracted from an alarm register, production statistics stored on one or more data tags, or other such information.

System 402 can also accept multimedia information from the client device 502 as a search query 702. For example, a user may record audio and/or video of a running machine on client device 502, and submit the resulting audio/video file to the system 402 as a search query 702. As will be described in more detail below, such audio/video files may be submitted to the system in order to obtain identification information for a machine or device recorded in the file, to compare visual or audio characteristics obtained from the file with baseline audio-visual characteristics previously recorded in the data model 202 and identify performance issues based on results of the comparison, or to perform other such functions.

Upon receipt of search query 702, device interface component 416 routes the query to search component 410, which searches federated data mode 202 for content relevant to the search query. Search query 702 may comprise, for example a data tag name (e.g., Tank1), a device or machine attribute, a device vendor, a name of a particular area of the industrial environment (e.g., a workcell or production line), a product name or identifier, or other such search criteria. Search component 410 searches the federated data model 202 for the search criteria identified by the search query 702, identifies data items corresponding to the search criteria, and returns a list of search results 704 to the client device via device interface component 416. Since the search results 704 may correspond to data items found on multiple disparate platforms throughout the plant environment (e.g., industrial controllers, HMIs, device documentation repositories, etc.), the device interface component classifies the results according to the platforms on which the results were found, location of the results within the plant environment (e.g., production area, workcell, etc.), or other classification criteria.

When multimedia search queries representing recent or current audio and/or video of a machine or automation system is submitted to the device interface component 416, the analysis component 412 can carry out diagnostic analysis on the submitted audio and/or video file based on information indexed in the data model 202. The multimedia information may be submitted manually by a user of client device 502, or may be collected by client device 502 substantially continuously and streamed to the device interface component 416 as the user traverses the plant environment. Example types of diagnostic analysis carried out by analysis component 412 on audio-visual data submitted to the system 402 will be described in more detail herein.

In addition to processing search queries submitted by a user via a client device, the industrial search and diagnosis system can also support automated dynamic searching and analysis. To this end, analysis component 412 can be configured to monitor one or more performance or operational metrics of an industrial system to identify issues requiring attention by an operator or maintenance expert. In scenarios in which audio and/or video feeds are provided to the system 402 from the plant floor, this monitoring may involve monitoring live audio-visual data of an automation system or machine in view of baseline audio-visual data indexed in the data model 202. In response to detection of a performance or operational issue, the analysis component 412 can perform an automated search of federated data model 202 to collect search results relevant to the detected issue. Notification component 414 can then deliver a notification of the detected issue together with the relevant search results to one or more client devices associated with selected plant personnel determined to be best suited to address the issue.

Figure 8:
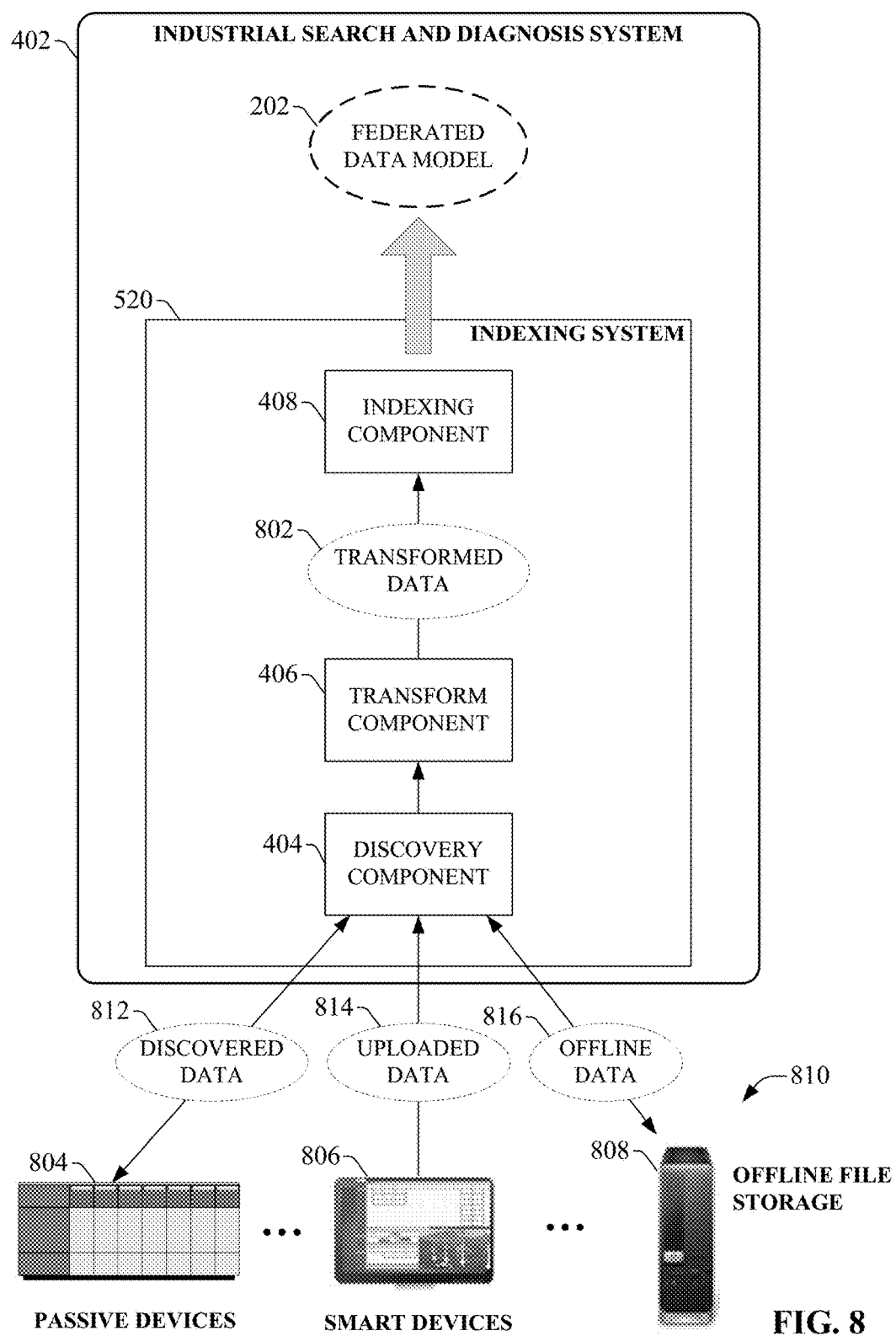
FIG. 8 is a block diagram that illustrates processing performed by the indexing system of search and diagnostic system.

FIG. 8 is a block diagram that illustrates processing performed by the indexing system 520 of search and diagnostic system 402. A given industrial environment may comprise a diverse, heterogeneous set of data sources 810. In order to unify the data available on these sources under a common namespace for search purposes, the discovery component 404 can be configured to discover data in a number of ways. Some devices within the plant environment may be passive devices 804, which only provide information regarding their available data items in response to a request from the discovery component 404 of the indexing system 520. Such a request may be initiated by the discovery agent 518 (see FIG. 5).

In an example scenario, when the discovery agent 518 discovers a new data source during traversal of the plant network, the agent will examine the data source to identify the data items on that device that are eligible for indexing in the federated data model 202. If the discovered data source is an industrial controller, for example, the available data items may comprise data tags or registers defined by the industrial controller's configuration and programming file. The discovery agent can also identify how and where the data items are used in the industrial controller's program (e.g., ladder logic, sequential function chart, structured text, etc.) so that this information can be indexed as well. For example, upon discovery of the industrial controller on the plant network, the discovery agent 518 may subsequently identify a tag named Tank1 defined in the controller's program file, representing a particular tank of an industrial batch process. In response to discovering this tag, the discovery agent can scan the control program to identify the routines and program locations (e.g., ladder logic rungs) on which Tank1 is referenced. The discovery agent 518 can also identify how each instance of Tank1 is used at each program location (e.g., output coil, normally open contact, function block argument, etc.).

The discovery agent may additionally identify other data items defined in the industrial controller that have a functional relationship with Tank1. For example, upon identifying a reference to Tank1 on an output coil of a rung of the control program running on the industrial controller, the discovery agent 518 can then identify the other data values and statuses defined on that rung that control the state of the Tank1 output coil, and record this relationship between Tank1 and each of the other data values and statuses.

In some embodiments, the discovery agent 518 can perform additional iterative scans of the control program to determine additional data values and statuses that affect the states of each of the related data items, since those additional data values/statuses also affect the status of the Tank1 output coil. The discovery agent 518 may iteratively cycle through the control program multiple times in this fashion in order to discover all relevant data items having a functional relationship with Tank1. Discovery agent 518 can also be configured to determine additional information related to a given data item that uses an alternative name. For example, by examining the tank definition in the controller, the discovery agent 518 can determine that there are additional values and devices (e.g., pumps) associated with the data tag of interest. The discovery agent could then determine, based on the controller's configuration information, the catalog number information for these related devices. The agent can then retrieve appropriate vendor documentation for these discovered devices, and generate a correlation number based on how closely the item is related to the original search. In the example described above, the agent may determine that there is a 90% correlation between the related device and the original data item that is the subject of the original search. The system can then provide this correlation statistic to a user. In some embodiments, the system can also allow the user to adjust the amount of related information that is returned in response to the search by setting a correlation limit (e.g., by instructing that only related items having at least an 85% correlation are to be retrieved). Higher correlation limits would return less related information, but the related information that is provided would be highly correlated to the original search. Lower correlation limits would yield a greater amount of related information, including information having smaller degrees of relevance. The system can present the results in a manner that sorts the correlated information in order of relevance to the original search.

In another example, the discovered data source may be an interface terminal executing an HMI application for visualizing a controlled process. In this scenario, the discovery agent may identify the terminal and proceed to scan the tag list defined in the HMI application to identify the data tags referenced by the HMI. These data items can include HMI tags linked to data tags of a networked industrial controller for display of associated controller data values or statuses on one or more of the HMI screens, or for writing values to the controller tags via an input object rendered on an HMI screen (e.g., a data entry field, a virtual push-button, etc.). For each discovered HMI tag, the discovery agent can identify the display screens on which the HMI tag is registered, as well as the external controller tags corresponding to the HMI tag. In some scenarios, the HMI tag may be identified by the same name as the corresponding controller tag (e.g., Tank1), although this may not always be the case.

The discovery agent 518 can package the information collected as described above—including an identity of the data source and its type (e.g., industrial controller, HMI, knowledgebase, device documentation, etc.), data items discovered on the data source, locations of the data items within an application running on the data source (e.g., routine and rung of a ladder logic program, HMI screen, etc.), correlations between the data items, etc.—and send this information back to the discovery component 404 as discovered data 812. Since the discovery agent 518 is capable of performing appropriate analysis on a number of different types of data platforms (e.g., industrial controller, HMI, device documentation, etc.) in order to identify the data platform and its available data, the discovery agent 518 may pre-format the discovered data 812 to conform a format compatible with the indexing system 520 prior to returning the discovered data 812 to the discovery component 404. In this way, the discovery component 404 and its associated discovery agent can automatically normalize heterogeneous data from diverse data formats into a common, homogeneous format that can be collectively processed and indexed by the indexing system.

Figure 9:
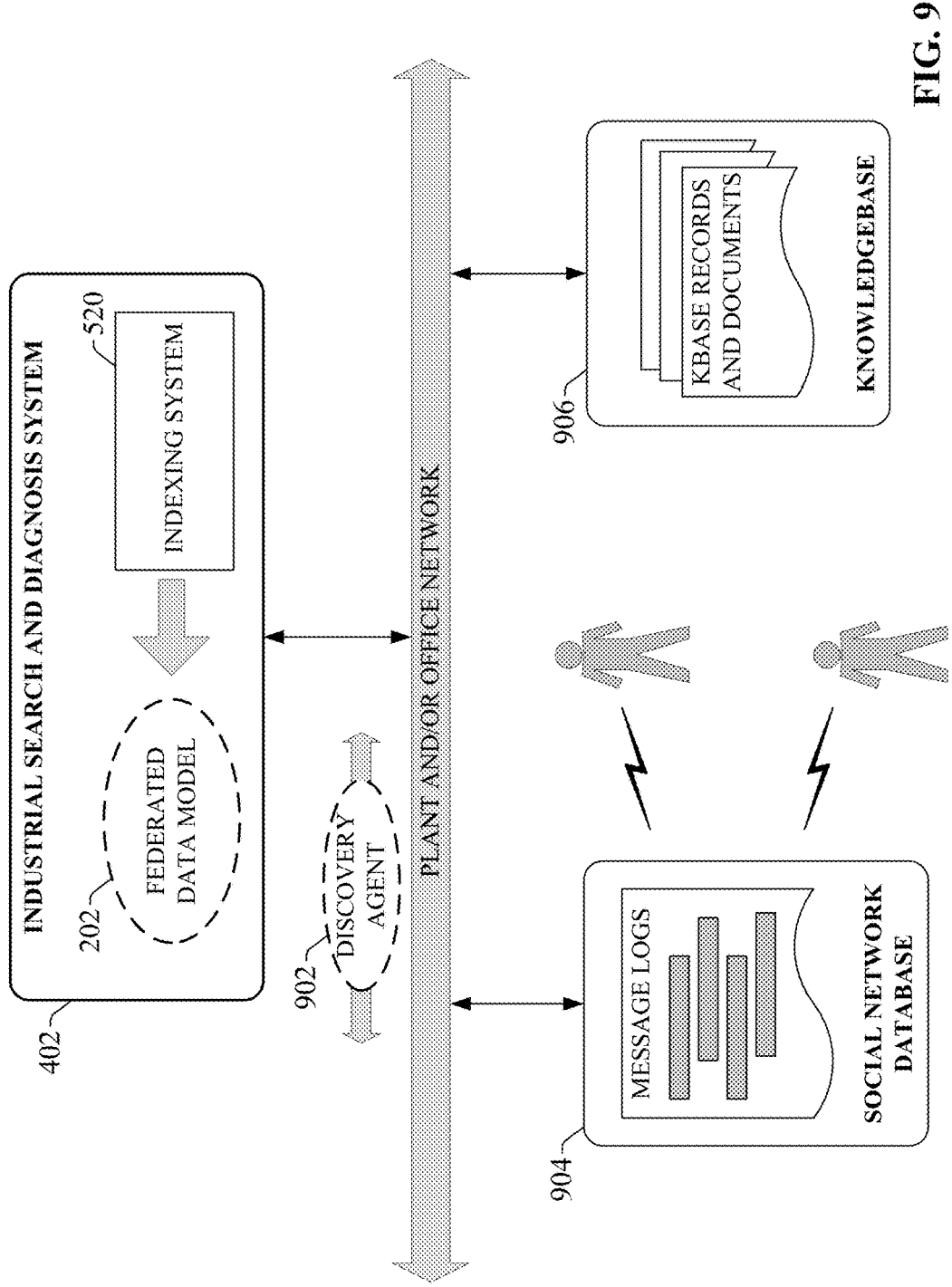
FIG. 9 is a diagram illustrating an architecture in which discovery agent collects and indexes message log information.

In some embodiments, the discovery agent may also be configured to examine social networks used by plant employees in order to generate tags based on instant messaging discussions relating to a project or troubleshooting issue. FIG. 9 is a diagram illustrating an architecture in which discovery agent 902 collects and indexes message log information. In this example, a social network database 904 stores written communications between plant personnel. The written communications may comprise instant message logs, e-mail threads, text records, or other communication records. During data discovery, the discovery agent 902 can identify the social network database 904 and parse the stored message logs for keywords that may be used to associate the message logs with a particular work area, machine, process, or device. For example, the discovery agent 902 may determine, based on discovery of particular keywords within a message log, that a particular stored conversation was generated in connection with troubleshooting a particular machine or industrial device. Accordingly, the discovery agent 902 can report the presence of the message log to the discovery component with an instruction to tag the message log as being relevant to the machine or device. In this way, when a subsequent search is performed on the federated data model 202 for the machine or device, the message log will be returned as a relevant result. These logs may detail steps taken by maintenance personnel in connection with solving a particular issue with the machine or device, and are therefore flagged by the system as a relevant result when a search is performed on that machine or device.

In some embodiments, the discovery agent 902 may associate relevant supplemental information with a discovered message log based on keyword analysis of the log. For example, the customer may maintain a knowledgebase 906 on the plant or office network containing knowledgebase records and/or device documentation relating to particular devices or maintenance issues. Upon determining that a message log relates to a troubleshooting session for a particular machine or device, the discovery agent 902 (or discovery component 304) may generate an association between the log and a knowlegebase record or device document relating to that machine or device. Thus, when a search is subsequently performed for the machine or device, the search system can present a message log outlining steps taken in the past to address a maintenance issue pertaining to the machine/device, with links to relevant knowledgebase articles or device documents to provide supplemental information.

Figure 10:
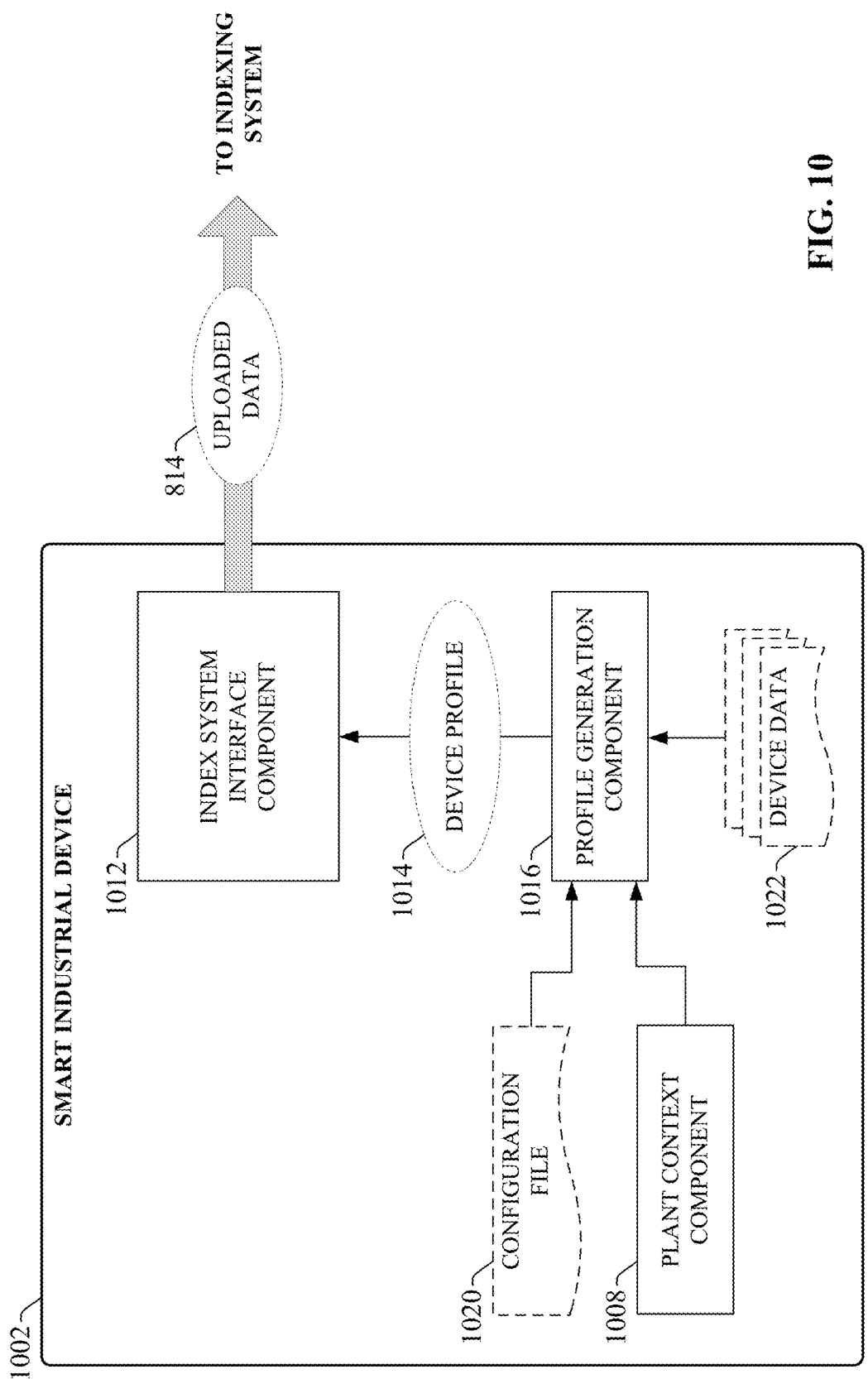
FIG. 10 is a diagram of an example smart device capable of self-reporting to indexing system.

Returning now to FIG. 8, in addition to passive devices 804, the industrial environment may include one or more smart devices 806 having integrated self-reporting functionality. Such devices can provide uploaded data 814 regarding their identity and available data items to the indexing system 520 directly without the need for analysis by a discovery agent. Turning to FIG. 10, an example smart device capable of self-reporting to indexing system 520 is illustrated. Smart device 1002—which may comprise substantially any type of industrial device or data storage unit (e.g., an industrial controller, an HMI terminal, a motor drive, device documentation storage, etc.)—includes an index system interface component 1012 configured to communicatively couple smart device 1002 to the indexing system 520 and exchange data therewith; e.g., via a plant network or over a public network such as the Internet (for configurations in which the indexing system resides on a web server or cloud platform).

When smart device 1002 is installed as part of an industrial automation system, index system interface component 1012 can establish communication with the indexing system 520. In one or more embodiments, the index system interface component 1012 can be configured to auto-discover the indexing system 520 on the common network. For example, the smart device 1002 may be pre-configured with the identification of the indexing system to which the device is to provide its identity and configuration information (e.g., a name associated with the indexing system, a machine identifier, a cloud or web address, etc.), or may be configured to perform a search of the plant network for compatible industrial indexing and search systems that may be present on the network. Any suitable handshaking protocol may be used to establish communication between the smart device 1002 and the indexing system.

Upon discovery of the search system, the smart device 1002 can package and send relevant information about the device and its available data to the indexing system, which integrates the reported data items in federated data model 202. In some embodiments, a profile generation component 1016 can generate a device profile 1014 for smart device 1002 to be sent to the indexing system 520 via index system interface component 1012. Device profile 1014 can convey information about smart device 1002, including but not limited to an identity and type of the device, device data 1022 available on the device, a context of the device within the industrial environment, any built-in displays or dialog screens (e.g., HTML pages) that provide access to the device's data, etc. In some embodiments, profile generation component 1016 may collect configuration information encoded in a configuration file 1020 stored on the smart device 1002, which may be a control program, a configuration or parameters settings file, an application file (e.g., an HMI application or HTML page), or other such file. The profile generation component 1016 can also identify available device data 1022 on the device (e.g., real-time or historical data tags, etc.). In some embodiments, the profile generation component 1016 can also identify relationships between the data items using techniques similar to those used by the discovery agent, including but not limited to the iterative relationship discovery process described above. The profile generation component 1016 can package this information into a device profile 1014, which is then sent to the indexing system as uploaded data 814 by index system interface component 1012.

Some embodiments of smart device 1002 may also include a plant context component 1008 configured to collect additional contextual information about the smart device 1002 for delivery to indexing system 520. Plant context component 1008 can determine a context of smart device 1002 within the plant or enterprise environment. For example, one or more embodiments of plant context component 1008 can identify other devices and systems within its local environment and make a determination regarding a location of smart device 1002 within a hierarchical plant context or device topology. Some embodiments of the federated data model may represent a given industrial enterprise in terms of multiple hierarchical levels and device hierarchies, where each level comprises units of the enterprise organized as instances of types and their properties. Plant context component 1008 can gather information that facilitates locating its associated smart device 1002 within an organizational or device hierarchy in a number of ways. In one example, plant context component 1008 can identify a topology of devices sharing a common network with smart device 1002 and interconnections between the devices. For example, if smart device 1002 is an industrial controller, plant context component 1008 can identify one or more discrete or analog I/O devices connected to the controller (e.g. based on a configuration file 1020 that defines the I/O module configurations for the controller). In addition, plant context component 1008 can identify other controllers on the network and their role within the overall industrial enterprise (e.g., the production areas, workcells, or processes associated with the respective controllers). In some embodiments, plant context component 1008 can also determine an identity of a particular network (e.g., a network name) to which smart device 1002 is attached. This information can be leveraged (either by profile generation component 1016 or an external application) to determine the device's location and role within the industrial automation system, since some networks may be dedicated to a particular production area. Some embodiments of plant context component 1008 may also identify a type of machine to which smart device 1002 is connected (e.g., a palletizer, wrapper, conveyor, etc.).

By gathering information about the local device topology, plant context component 1008 can facilitate identifying a location of smart device 1002 within the enterprise hierarchy. In some embodiments, this determination of the location within the enterprise hierarchy can be made by plant context component 1008 itself. Alternatively, profile generation component 1016 can include information gathered by plant context component 1008 in device profile 1014 so that the indexing system 520 can accurately represent smart device 1002 within the enterprise or device hierarchy.

Some smart devices may also store pre-defined interface screens (e.g., HTML screens) used for device configuration or visualization of operational data. The indexing system can detect these screens (either using the discovery agent or based on information in the device profile 1014 provided by the device) and index these screens in the federated data model 202.

Returning to FIG. 8, the indexing system 520 may also collect and index offline data about certain industrial devices rather than gather information about the devices directly from the devices themselves. In this regard, some industrial devices may have information about their configuration, programming, and available data items captured and stored as offline files stored on separate offline file storage devices 808. Accordingly, one or more embodiments of the discovery agent 518 can identify and process these offline files in a similar manner as described above in order to index these devices in the federated data model.

Figure 11:
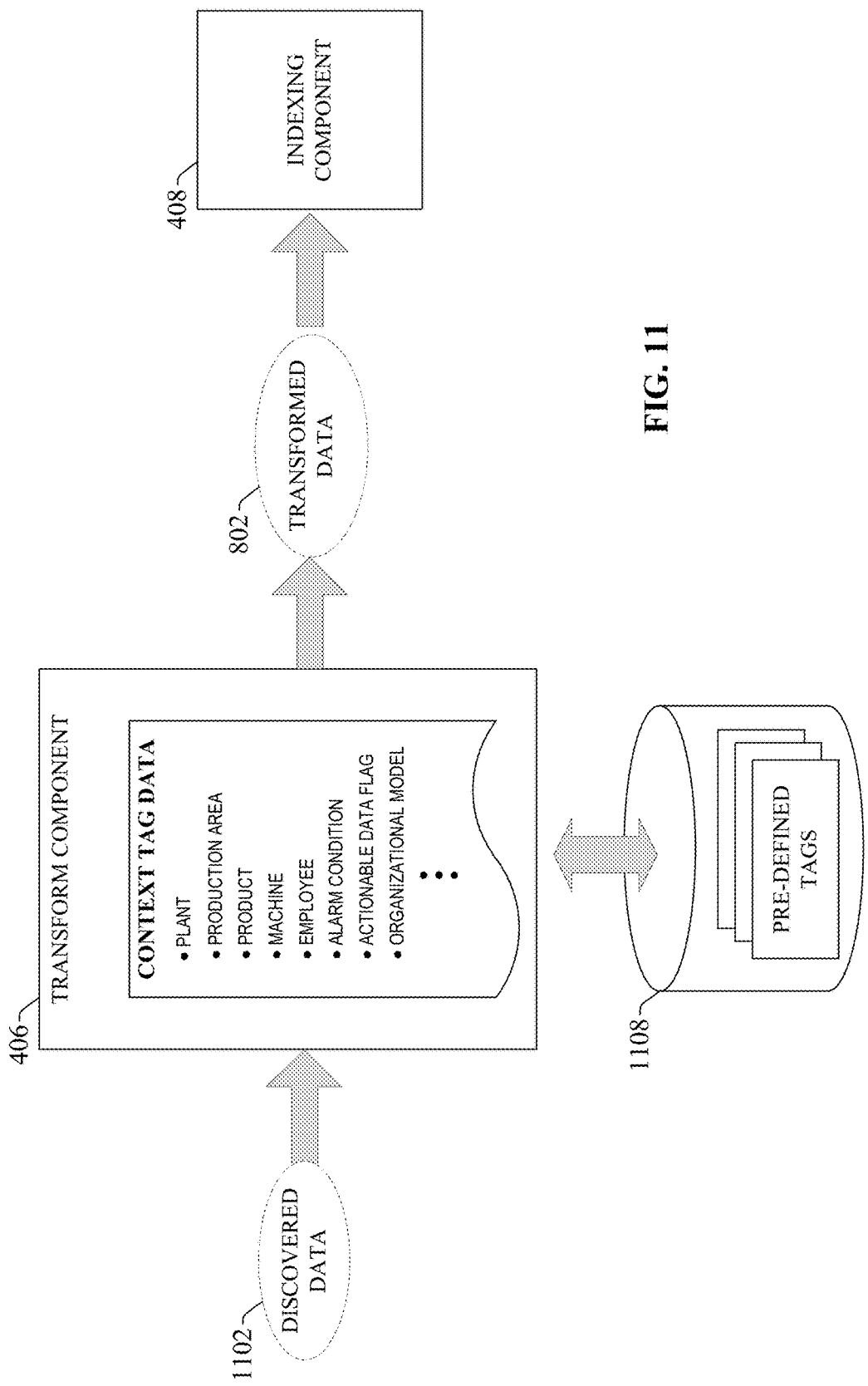
FIG. 11 is a block diagram illustrating transformation of discovered data by a transform component.

Transform component 406 can perform any necessary transformation on the data collected by discovery component 404 prior to indexing. This can include, for example, normalizing any data that was not appropriately formatted by the discovery agent 518, so that all collected data accords to a common format usable by the indexing system 520. In some embodiments, transform component 406 can also add contextual data or tags to the collected data items to achieve highly granular indexing for search purposes, as well as to facilitate subsequent discovery of interdependencies between the diverse and plant-wide data items. FIG. 11 is a block diagram illustrating transformation of discovered data 1102 by transform component 406. As noted above, the discovery agent 518 (or discovery component 404) may add some contextual information to the discovered data items prior to sending the data to transform component 406. However, in some cases the transform component 406 may be able to add additional context to this data based on information not available to the discovery agent 518. In other scenarios, the discovery agent 518 may not have been able to contextualize all the discovered data due to limited available information about a given device (e.g., in the case of an older legacy device with limited capabilities).

Contextual data that can be added by transform component 406 for a given data item can include, but is not limited to, an identifier of a plant and/or production area at which the source of the data item resides; a machine or product to which the data item relates; one or more employees to be associated with the data item (e.g., based on the production area, shift during which the data item was collected, etc.); a concurrent alarm condition determined to be relevant to the discovered data item; an actionable data flag indicating that the value of the collected data item requires a response from plant personnel; or a tag indicating the location of the data time within the context of a hierarchical organizational model of the plant (e.g., in terms of an enterprise level, plant level, work area level, machine level, control level, etc.).

In some embodiments, the transform component 406 can selectively tag discovered data items with one or more pre-defined tags 1108 defined in association with the indexing system 520. These tags may be used to contextualize the discovered data based on one or more user-defined tag categories based on tagging rules. For example, the user may define a tagging rule indicating that data collected from data sources within a particular workcell or machine of the plant are to be tagged with a pre-defined tag that associates the data items with a person, product, or other classifier for indexing and searching purposes. The tags 1108 allow the user to define relationships between sets of data that may not be automatically discoverable by the discovery component 404 and its associated discovery agents. In some embodiments, the indexing system may also be configured to maintain a user-defined system view that allows a user to selectively associate different devices under a combined unit of organization. This user-defined association can subsequently be used by the search system to ensure that all relevant devices are located in response to a search query. For example, when one device (and its associated data) is located within the logical hierarchy of the system defined by the federated data model in response to a search query, other devices having a user-defined association with the located device will also be identified and retrieved as a relevant search result. In some embodiments, these user-defined associations may also be made between selected data items stored on different devices (data-level associations), as well as between the device's themselves (device-level associations).

In some embodiments, the transform component 406 may also auto-generate tags for a given data item based on contextual information, including but not limited to rung comments associated with a controller tag, learned interdependencies between a newly discovered data item and a previously discovered data item (e.g., learn that Pump5 is associated with Tank1, and tag Pump5 as being associated with Tank1, or tag both Tank1 and Pump5 according to the larger system in which they operate), or other discovered contextual information. The indexing component 408 can associate similarly tagged data items in the federated data model 202 regardless of the platform in which they were discovered. For example, the indexing component 308 can associate common or related data items discovered, respectively, in an industrial controller, an HMI, and a data historian.

Returning now to FIG. 8, the transform component 406 provides the transformed data 802 to indexing component 408, which indexes the discovered data and interdependencies therebetween in federated data model 202. The industrial search and diagnosis system 204 can then be used to submit search queries to the federated data model 202, or to perform analysis on the data model, as described above in connection with FIG. 7.

Figure 12:
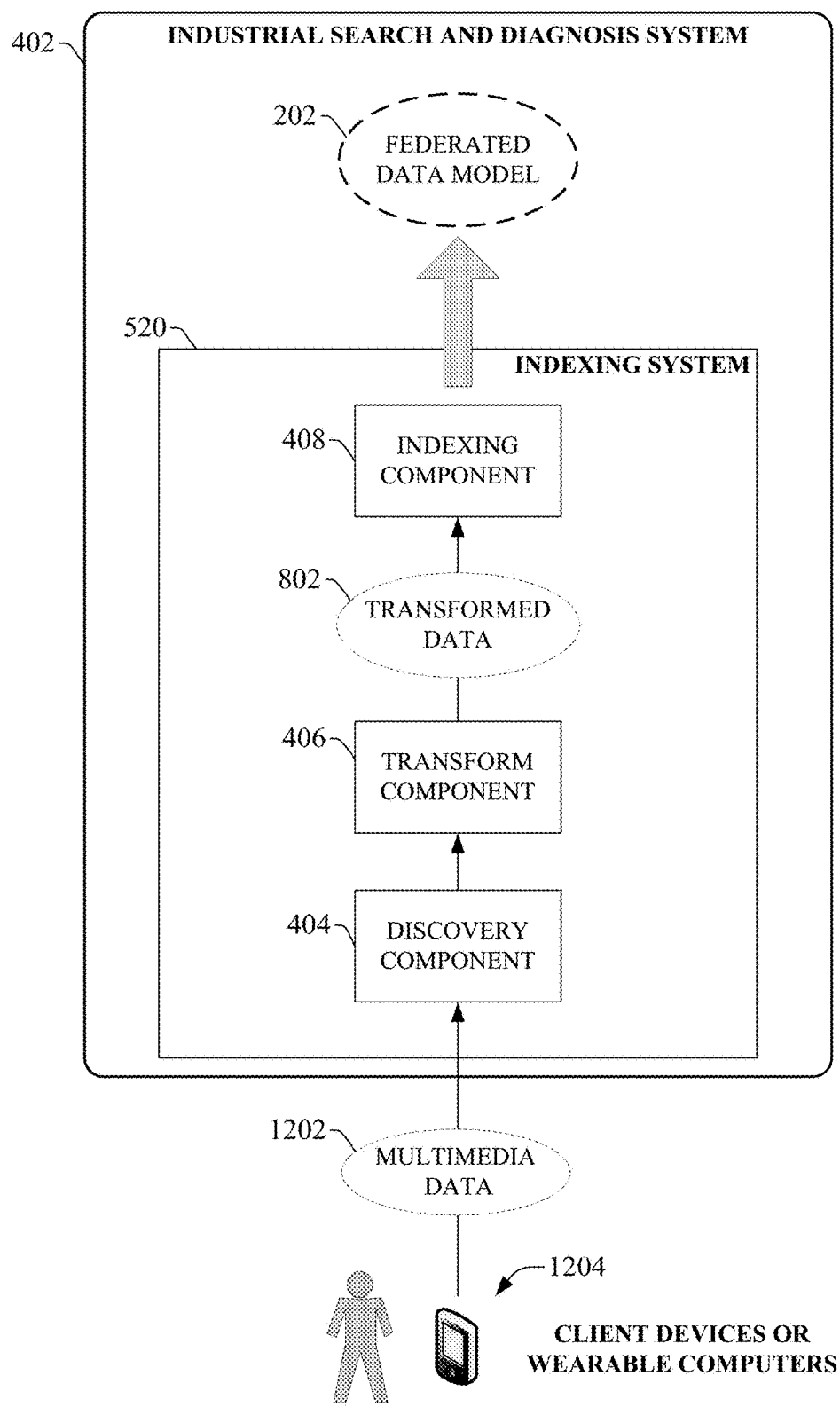
FIG. 12 is a block diagram that illustrates submission of multimedia data to the search and diagnostic system.

In addition to the discovered data 812, uploaded data 814, and offline data 816 described above in connection with FIG. 8, multimedia data can also be submitted to the system 402 and indexed in the data model 202. FIG. 12 is a block diagram that illustrates submission of multimedia data to the search and diagnostic system 402. In this example, a client device 1204 captures multimedia data using its native media capturing functionality. Client device 1204 may be any personal device capable of recording images, audio, and/or video, including but not limited to a portable phone, a tablet computer, a wearable computer, a laptop computer, or other such device. The multimedia data 1202 can be, for example, an audio recording of an industrial environment or, in particular, of a running machine or industrial system. In some scenarios, the audio recording may be a voice message recorded by the owner of client device 1204 for submission to the system 402. The multimedia data 1202 may also be a digital image or video clip of a machine or automation system. To initiate the process of indexing the multimedia data 1202, the client device 1204 remotely connects to the indexing system 520 and sends the multimedia data 1202 to the discovery component 404. In some scenarios, the client device 1204 can send the multimedia data 1202 as a discrete file (e.g., an audio, video, or image file).

The system 402 can index the multimedia data 1202 for a variety of purposes. For example, the multimedia data 1202 may be an image or video of a machine or industrial device to be used as a visual reference. Accordingly, the indexing system 520 can index the multimedia data 1202 in the data model 202 association with the relevant machine, so that the system 402 can render the image or video on a user's client device when the relevant machine or device is invoked as part of a search query.

In another example, the multimedia data 1202 may be an image, video, or audio of a running machine, and the system 402 may index the data 1202 as an audio or visual baseline representing normal operation of the machine. When this baseline representation is submitted, the indexing system 520 will index the multimedia data 1202 in the data model 202 association with the relevant machine for future comparisons. The multimedia file 1202 may also be submitted to the system 402 as an audio and/or visual representation of a particular machine or system abnormality (e.g., a leaking pump, a slipping belt, excessive part vibration, etc.), so that the search and diagnosis system 402 can identify occurrence of the abnormality based on subsequently submitted image or audio information collected from the machine.

Figure 13:
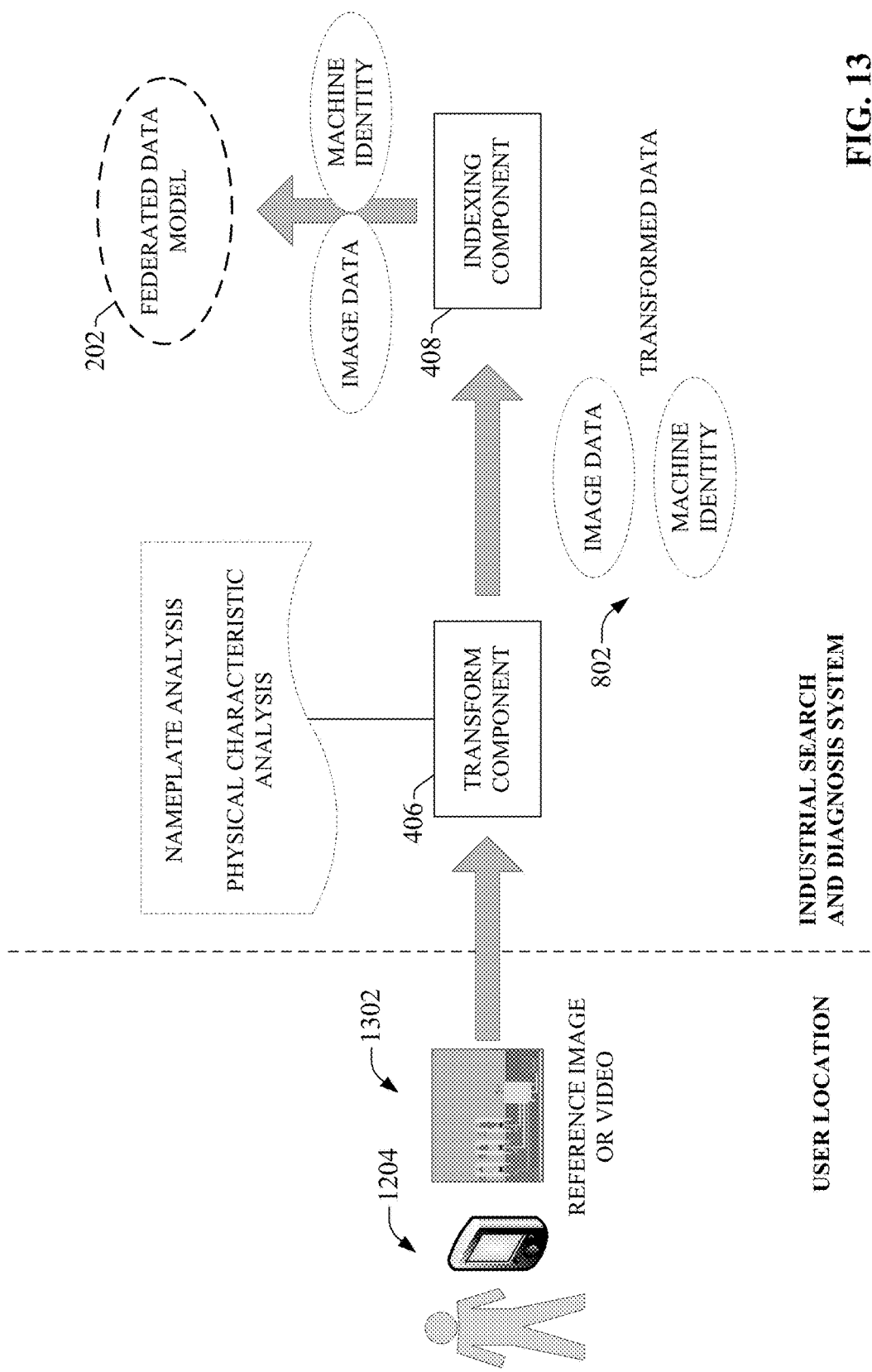
FIG. 13 is a diagram illustrating transformation of a submitted image or video to information that can be indexed in the data model.

When the multimedia data 1202 is submitted, the transform component 406 can append contextual data to the multimedia data 1202 in a manner similar to that described above in connection with FIG. 11. For example, the transform component 406 can tag the received image, video, or audio file with information identifying the machine, device, or automation system represented by the file. In some embodiments, this machine or system identification may take the form of a hierarchical tag that identifies the machine, device, or automation system in terms of multiple hierarchical levels that describe the machine's location with in the industrial enterprise (e.g., a plant, a production area, a workcell, and a machine identifier). If the multimedia data 1202 is an image or video of a particular machine or industrial device, the transform component 406 may also tag the file with information identifying a vendor and model of the machine or device. To this end, some embodiments of the transform component 406 may be configured to perform image analysis on the image or video to identify characteristic visual features of the machine or device. FIG. 13 is a diagram illustrating transformation of a submitted image or video to information that can be indexed in the data model 202. In an example embodiment, the transform component 406 may be configured to recognize nameplate information located on a particular motor or machine; e.g., by first identifying the type of the machine based on its shape or other characteristic features, and then analyzing the location on the machine where the nameplate is expected to be located, where the expected nameplate location is based on the type of machine. Once the nameplate information is discovered in the image or video data, the transform component 406 may perform optical character recognition or other suitable analysis to read and extract the information inscribed on the nameplate. The transform component 406 can then tag the multimedia file with this extracted machine identity information. Some embodiments of the transform component 406 may be configured to employ other methods of identifying machines and industrial devices—e.g., by recognizing other physical characteristics of the machines or devices—as an alternative to nameplate recognition. The resulting transformed data 802 comprising the image or video information and the machine identify information can then be sent to the indexing component 408, which indexes the multimedia file in the data model 202 based on the contextual information applied by the transform component 406.

Figure 14:
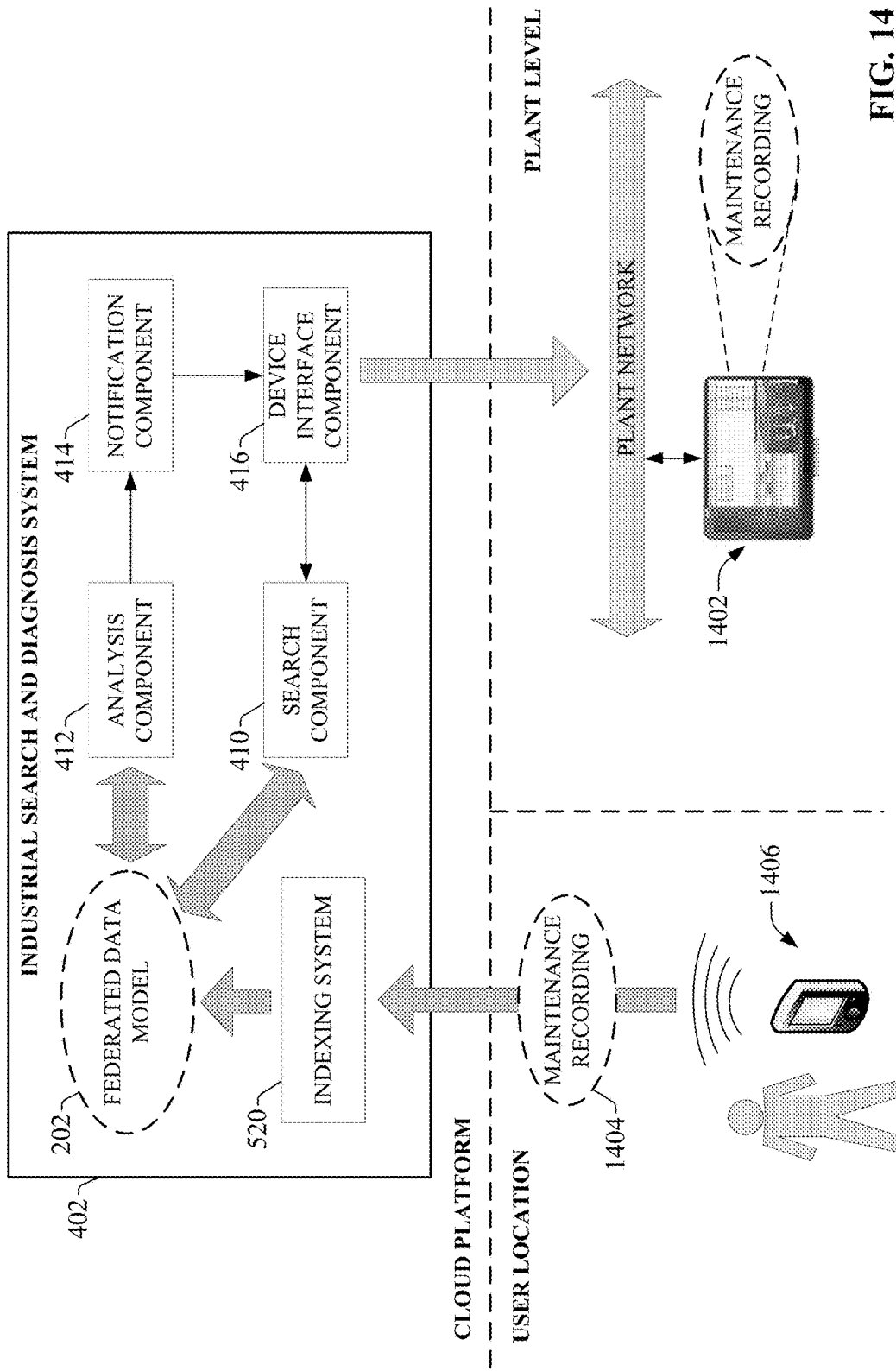
FIG. 14 is a diagram illustrating submission, indexing, and distribution of maintenance recordings.

Indexed multimedia information can be used by the system 402 in a variety of ways. For example, maintenance personnel can use system 402 to store and distribute vocal recordings relating to maintenance issues. FIG. 14 is a diagram illustrating submission, indexing, and distribution of maintenance recordings. In this example, a user of client device 1406 may wish to record a voice message relating to a maintenance issue, and to make this message available to other maintenance personnel or machine operators who interact with the machine or automation system to which the maintenance issue relates. The message may be, for example, an explanation of a repair that was performed on the automation system by the user, an instruction that certain specified functions of the automation system should not be used until a further maintenance operation is performed, instructions directed to maintenance personnel on a subsequent work shift providing information necessary to continue repairs, or other such voice recordings. System 402 can allow the user to submit this maintenance recording 1404 to the indexing system 520, and to associate the recording 1404 with the relevant machine or automation system.

The indexing system 520 can index the maintenance recording 1404 in the federated data model in association with the relevant machine or automation system. In some embodiments, the indexing system 520 may allow the user to explicitly select or otherwise indicate the machine or automation system with which the maintenance recording 1404 is to be associated. To this end, the indexing system 520 may generate and serve suitable interface displays to client device 1406 that allow the user to select the appropriate machine or automation system (e.g., by browsing the defined machines or automation systems defined in the data model 202). Alternatively, in some embodiments, the indexing system 520 may infer which machine or automation system the recording 1404 relates to based on a location from which the recording 1404 was received. For example, upon receipt of the recording 1404 from client device 1406, the transform component 406 of the indexing system 520 may apply a geo-tag to the received recording 1404 identifying a geographic location of the client device 1406 at the time the recording 1404 was made and/or sent to the system 402. The indexing component 408 may correlate this geographic location information with the locations of plant facilities, production areas, machines, and/or automation systems defined by the data model 202 in order to infer which particular machine, automation system, or production area the recording should be associated with.

Once the recording 1404 has been indexed, the system 402 can distribute the recording to other users in a targeted manner. For example, the indexing system 520 may associate the recording with an HMI terminal 1402 associated with the relevant machine or automation system (determined as described above), such that an operator or other user can invoke the recording from the HMI terminal 1402. To this end, the device interface component 416 may remotely render a graphic or other interactive link on the HMI terminal 1402 indicating that a maintenance recording is available for the relevant machine or automation system. In response to selecting this interactive graphic at the HMI terminal 1302, the notification component 414 can retrieve the maintenance recording from the model 202, and cause the device interface component 416 to deliver the recording to the terminal 1402 for playback.

Figure 15A:
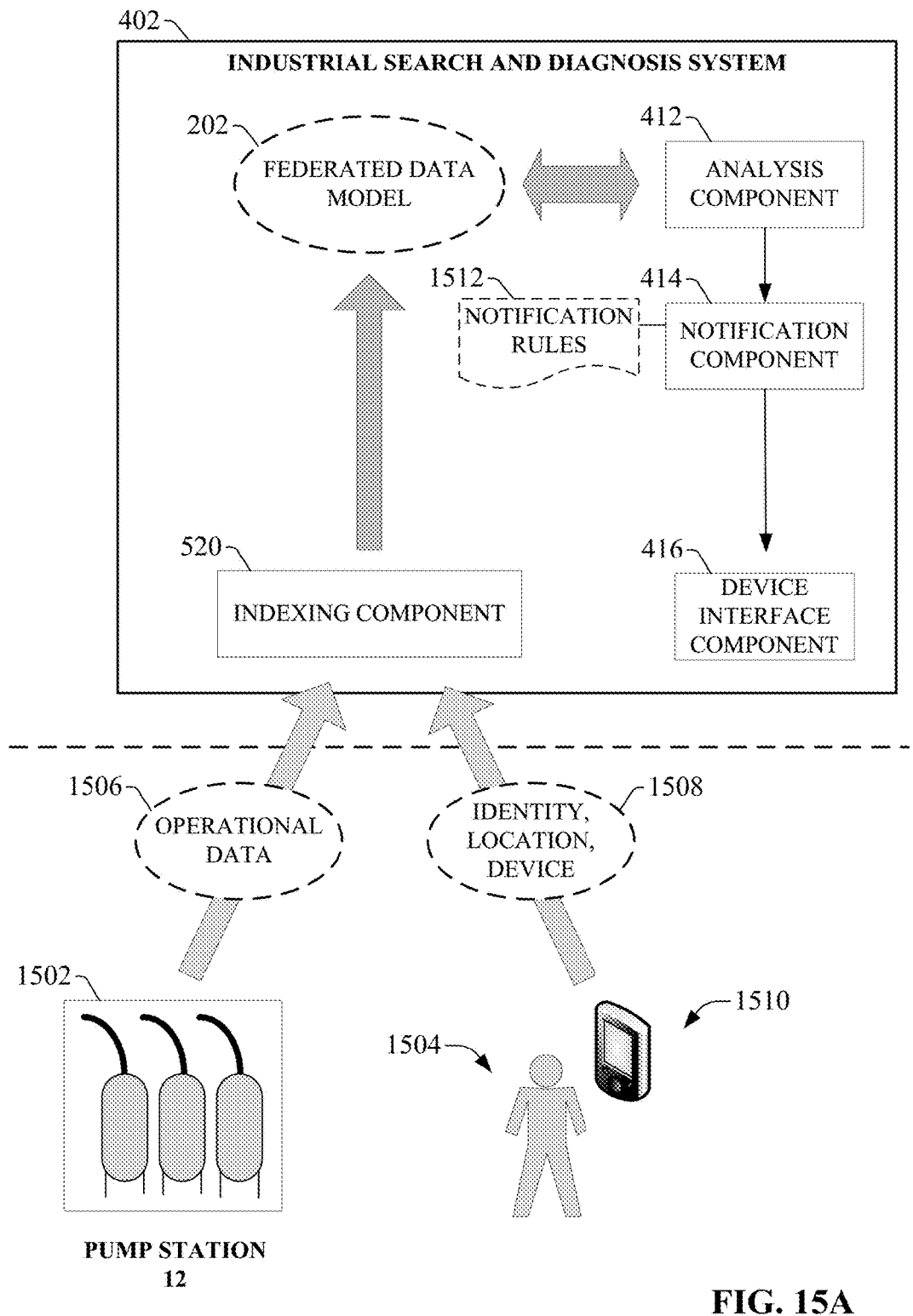
FIGS. 15A and 15B are diagrams illustrating identity- and location-based delivery of a previously indexed maintenance recording.
Figure 15B:
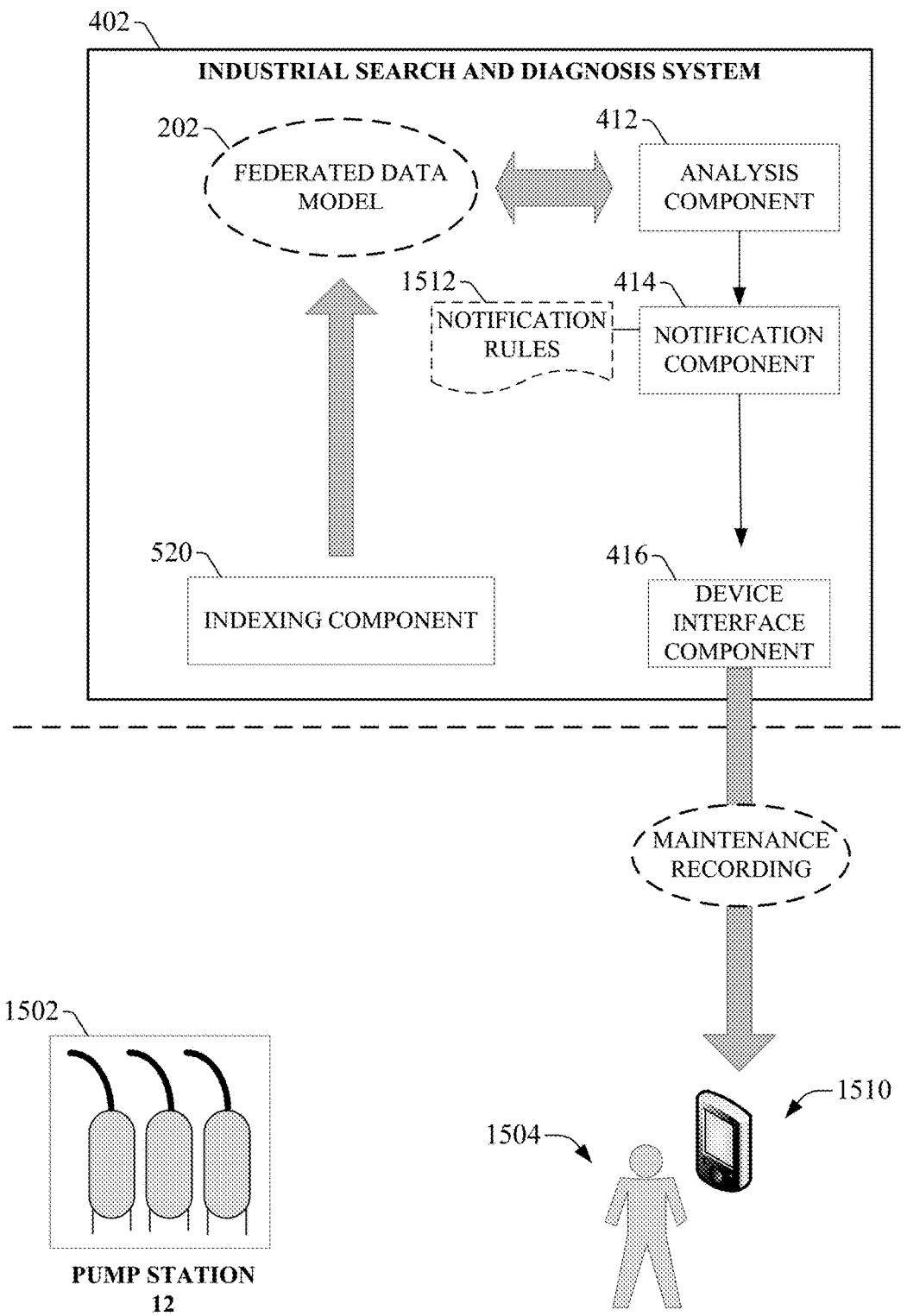

In another example, the notification component 414 may be configured to selectively push the maintenance recording 1404 to one or more client devices associated with relevant plant personnel. FIGS. 15A and 15B are diagrams illustrating identity- and location-based delivery of a previously indexed maintenance recording. In this example, the notification component 414 can determine which users are to receive the recording based on identifications of plant personnel associated with the relevant machine or automation system to which the recording relates. These employee-to-machine associations may be defined by data model 202, or by stored notification rules 1512 that define such associations. In some scenarios, the notification component 414 can determine when to deliver the maintenance recording to a user based on the user's location relative to the machine or automation system to which the message relates. For example, the device interface component 416 or a separate user monitoring component may be configured to track plant employee locations by monitoring the locations of the employees' personal client devices (e.g., mobile handheld devices, wearable computers, etc.), such as client device 1510. The location information may be obtained, for example, based on global positioning system information read from the client device 1510, or using other location tracking techniques). The client device 1510 can also provide the indexing system 520 with identification information for the owner of the device, as well as a type or model of the client device (from which the device interface component 416 can determine the multimedia capabilities of the client device for notification purposes).

In response to determining that client device 1510 belongs to a relevant plant employee (based on the employee identification information provided by the device 1510), and that the client device 1510 has moved within a defined range of the machine or automation system to which the recording 1404 is tagged, the notification component 414 can retrieve the recording from the data model 202 and push the recording to the client device as a recorded vocal notification, as show in FIG. 15B, thereby conveying the recorded message to the user at a time that the system deems the message to be relevant to the recipient; i.e., when the recipient is near the machine or automation system to which the message pertains. In some embodiments, the notification component 414 may further customize delivery of the message to client device 1510 based on notification rules 1512 maintained on the system 402. Notification rules 1512 can comprise, for example, identities of plant personnel and their respective roles (e.g., operator, maintenance, shift supervisor, billing personnel, plant engineer, inventory manager, etc.), rules regarding which types of users or user roles should receive notifications for different categories of events, restrictions on the types of data that can be presented to each user based on the user's role, location-based restrictions on data presentation, how data should be presented for each type of device (e.g., based on an identification of the device type provided by the client device), or other such notification rules.

Although the message distribution features described above in connection with FIGS. 14, 15A, and 15B were discussed with reference to a recorded audio message, it is to be appreciated that the search and diagnostic system 402 can distribute other types of multimedia messages in a similar manner. For example, rather than a recorded audio message, a user (e.g., a maintenance person or plant engineer) may capture digital photographs or record a video file of an operating machine using client device 1406 (e.g., to record an observed operating abnormality that the user wishes to share with other maintenance personnel for review), and submit the images or video footage to the indexing system 520. The images or video can then be distributed in a similar manner to that used to distribute the maintenance recording.

Industrial search and diagnosis system 402 can also allow multimedia data to be indexed in the data model 202 for comparative purposes, in order to assist users in identifying and diagnosing machine performance issues based on visual and/or audio characteristics of the machine. To facilitate such comparison, reference images, video, and/or audio of a running machine or automation system can be captured by a client device (e.g., a mobile phone, a wearable computer, etc.) and submitted to the system 402 and indexed in data model 202 (e.g., using techniques described above in connection with FIGS. 12 and 13). The indexed multimedia information can be categorized in the data model 202 according to whether the multimedia data represents a normal operation or state of the machine or automation system, or alternatively represents a particular abnormality that can be identified based on audio or visual inspection. FIG. 16 illustrates an example multimedia categorization 1602 that can be maintained by the search and diagnosis system 402. In this example, a number of maintenance categories for a given industrial automation system are defined, with one or more videos, images, or audio files indexed to each category. A first category of indexed multimedia information may represent normal operation of the automation system. In addition, one or more categories of abnormal operation may be defined (e.g., Leaking Pump #1, Slipping Belt on Drive Motor #12, etc.), with one or more audio files, digital images, and/or video files representing the abnormal condition being associated with each category. In some embodiments, one or more of these categories may be defined by the user (e.g., the user of client device 1204 in FIG. 12) upon submission of the multimedia file to be associated with the respective categories In addition to categorizing the reference multimedia information in the respective categories, the analysis component 412 may also generate metadata for each multimedia file that can be used to facilitate subsequent comparative analysis. For example, for each reference image or video associated with an abnormal condition, the analysis component 412 may identify particular visual characteristics that distinguish the reference image or video from the normal state. In the case of a leaking pump, for example, the analysis component 412 may identify a visual presence of fluid on or near a particular seal or joint, where such fluid is not present during normal operation. Accordingly, the analysis component 412 can generate metadata indicating this visual characteristic as indicative of a leaking pump. In another example, analysis component 412 can analyze a video of a running machine and infer a speed of motion of a moving part, a rate at which products pass through the frame, or other such characteristics. Other types of analysis carried out by the analysis component 412 may also include identification of a vibration of a machine component or device, and measurement of the vibration rate.

Identification of this characteristic can be identified using any suitable analytical method, including but not limited to comparison of the abnormal image/video with an indexed image/video representing normal operation. Similar metadata can be generated for audio files. For example, the analysis component 412 may determine that a reference audio file submitted to represent a slipping belt on a particular drive motor includes a characteristic audio frequency within a particular frequency range that is not present during normal operation. Accordingly, the analysis component 412 can generate metadata indicating that presence of this high-frequency noise indicates a belt slippage for the indicated drive motor.

Figure 17:
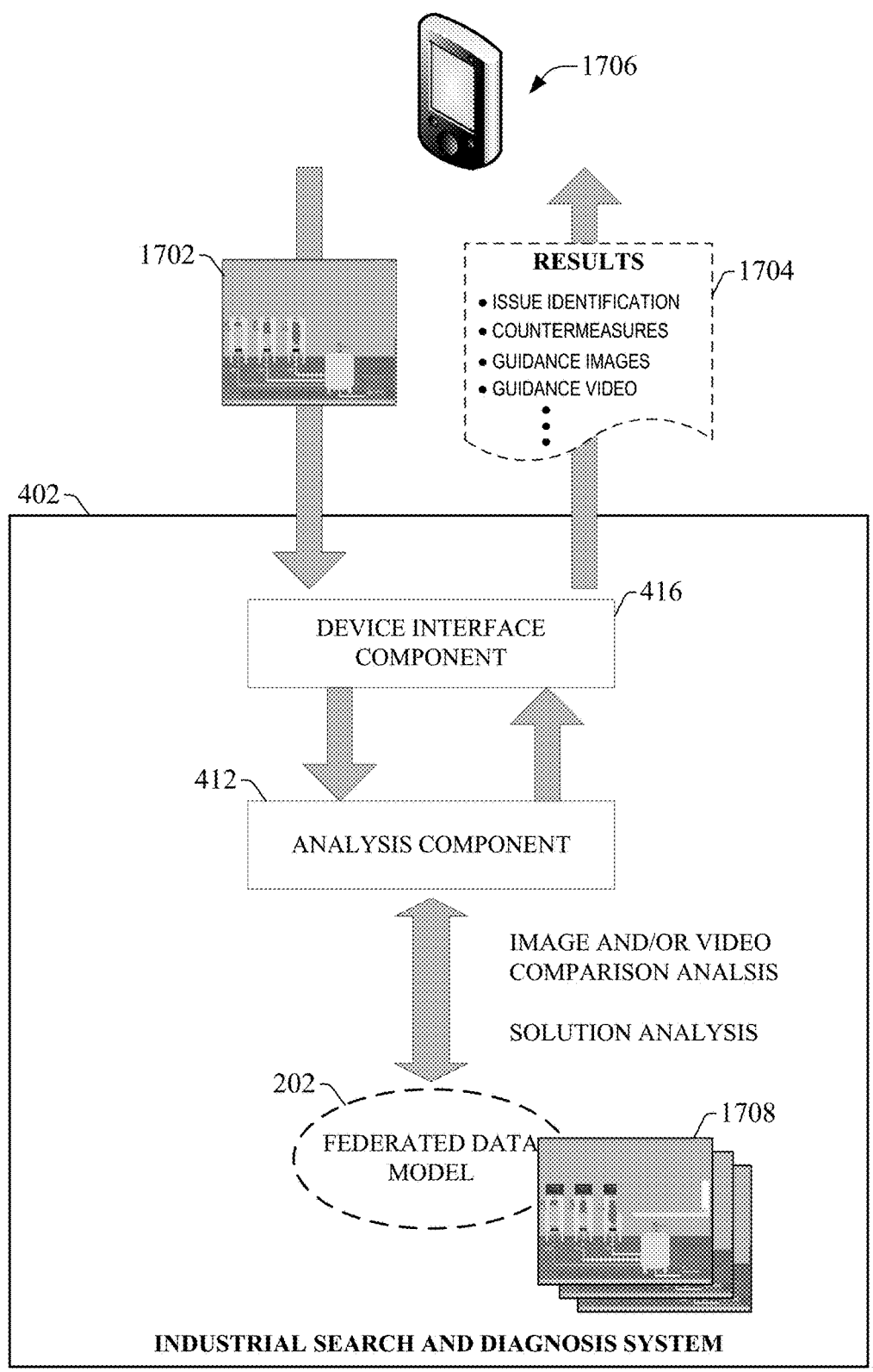
FIG. 17 is a diagram illustrating submission of multimedia information to a search and diagnosis system to facilitate diagnosis and countermeasure identification.

Once such reference multimedia information is indexed by the system 402, users can submit subsequent multimedia information recorded for the automation system, and the search and diagnosis system 402 can identify a performance or operational issue with the automation system based on comparisons with the reference multimedia information. FIG. 17 is a diagram illustrating subsequent submission of multimedia information to the system 402 to facilitate diagnosis and countermeasure identification. In this example, a user has recorded audio or visual information of at least a portion of an automation system using client device 1706, where reference multimedia information 1708 has been previously submitted for the automation system (as described above). In an example scenario, the user may have observed a potential problem with a portion of the automation system (e.g., a pump, a motor, a conveyor, an industrial robot, etc.), and taken a photograph or video of the area of concern (or recorded audio of the automation system). The user can then submit the resulting multimedia file 1702 (e.g., an audio, visual, or audio-visual file) to the system 402, where analysis component 412 performs comparative analysis on the multimedia file 1702 based on the previously submitted reference information submitted for the automation system.

In an example comparative analysis, analysis component 414 may compare the multimedia file with reference multimedia files corresponding to the same multimedia type as the submitted file 1702, as well as any metadata associated with the reference files previously generated by analysis component 412; e.g., metadata indicating portions of an image to be examined for presence of certain visual characteristics indicative of a particular maintenance or performance issue, metadata indicating which noise frequencies of an audio recording indicate occurrence of a maintenance or performance issue, etc. Based on results of these comparisons, the analysis component can generate and deliver result information 1704 to client device 1706 that identifies a maintenance or operational issue inferred from the submitted multimedia file 1702. In some embodiments, the issue identification information may comprise a text-based description of the issue (e.g., an identity of the affected device or machine, a description of the issue, etc.), an image or video of the affected machine or device that includes superimposed graphics identifying areas of concern, a voice message describing the issue that was previously recorded and indexed by another employee, or other such information.

Additionally, if the identified issue is an issue for which a countermeasure can be identified based on analysis of the data model 202, the result data 1704 may also include information regarding recommended countermeasures for addressing the issue. Such countermeasure recommendations may be based, for example, on known solutions to the issue that have been previously indexed in the data model 202 (e.g., device documentation for one or more affected industrial devices, data retrieved from vendor-specific technical support websites, maintenance notes or messages generated and indexed by maintenance personnel who have previously addressed the identified issue, etc.). In some embodiments, the device interface component 416 may also retrieve and deliver, as part of the result data 1740, guidance images or videos that convey a particular solution workflow or otherwise guide the user through the process of addressing the identified issue. Such images or video may have been previously indexed in the data model 202 by other maintenance personnel and tagged in a manner that causes the images or videos to be invoked when a similar issue is detected based on a result of the aforementioned comparative analysis.

Figure 18A:
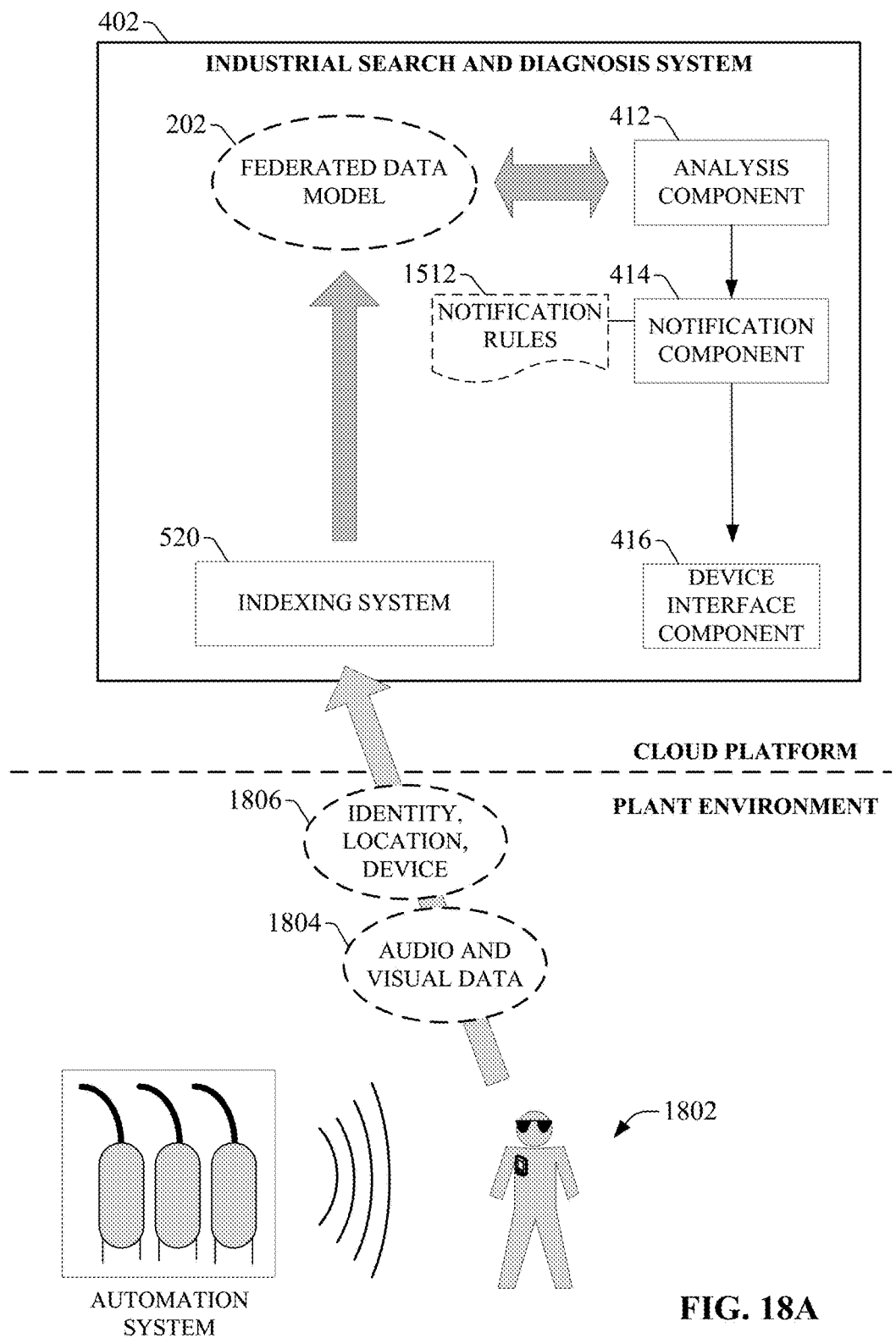
FIGS. 18A and 18B are diagrams illustrating dynamic search and analysis performed by the search and diagnosis system as a user traverses a plant environment.
Figure 18B:
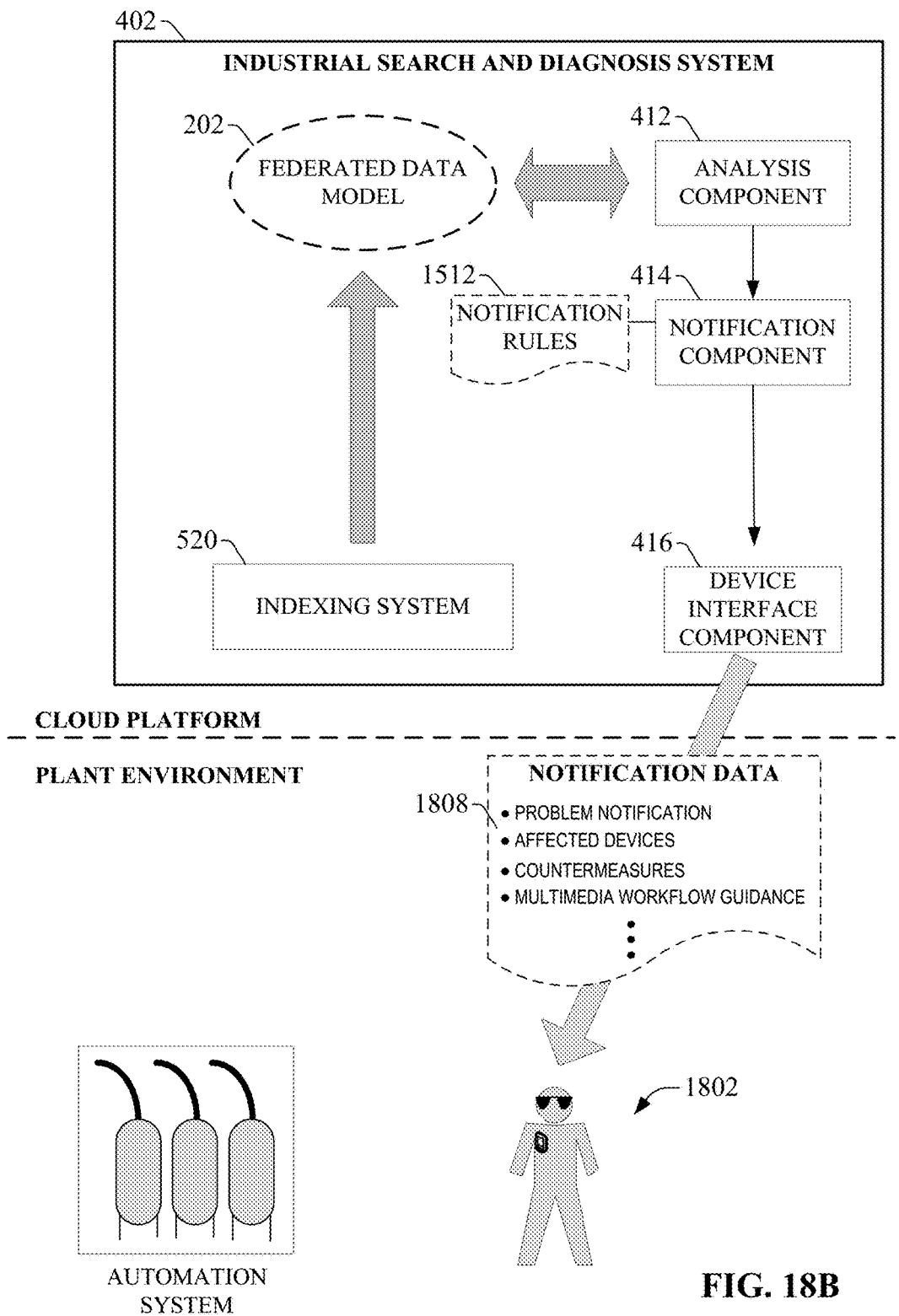

While diagnosis based on submitted multimedia information has been described above in terms of manually submitted multimedia audio, images, or video, some embodiments of search and diagnostic system 402 can support dynamic automated search and diagnosis based on multimedia information automatically collected by a user's client device and sent to the system 402. FIGS. 18A and 18B are diagrams illustrating dynamic search and analysis performed by the search and diagnosis system as a user traverses a plant environment. In this example, search and diagnosis 402 system resides and executes on a cloud platform, and is capable of remotely exchanging data with authorized client devices worn or carried by plant personnel. A wearable computer or other type of client device worn or carried by a user 1802 (e.g., maintenance person, operator, plant engineer, or other plant employee) can collect audio and/or visual data from the user's immediate surroundings as the user traverses the plant. The wearable computer may continuously or periodically collect this multimedia data as a background process and submit this data 1704 to the search and diagnosis system 402 on a continuous or semi-continuous basis for analysis based on indexed data in the federated data model 202.

Concurrently with collection and submission of the multimedia data 1704 representing the user's surroundings, the indexing system 520 or another user monitoring component associated with the search and diagnosis system 402 can track user 1702 as the user navigates the plant. In some embodiments, the indexing system 520 may track the user's location by monitoring the location of the user's personal client device (e.g., mobile handheld device, wearable computer, etc.). The user's unique client device provides the search system with user information 1806 regarding the user's identity, current location, and type of client device carried by the user.

In some embodiments, the user's identity information may be used by notification component 414 to determine what kind of information should be provided to the user 1802 in the event that the multimedia data indicates an issue that warrants notification. For example, device interface component 416 can be configured to provide users associated with a machine operator role only with information relating to operational issues, and to provide users associated with maintenance or engineering roles with more detailed troubleshooting information, or information having a higher granularity relative to information that would be provided to machine operators. In various embodiments, information regarding the classes of information to be provided to respective user roles can be defined in the notification rules 1512 stored in association with system 402.

The user's location information can be used by the analysis component 412 to assist in correlating the multimedia data 1804 sent by the user's wearable computer or client device with relevant data indexed in the federated data model 202. For example, based on the current location information obtained by tracking the user 1802, the analysis component 412 can determine which automation system or machine within the plant corresponds to the multimedia data 1804 currently being received from the user's wearable computer. In some embodiments, the analysis component 412 can determine the user's proximity to a given automation system or machine by correlating the current location information received from the user's wearable computer or client device with recorded locations of the respective automation systems or machines indexed in the federated data model 202.

Based on this determination of which automation system is within the user's visual or audio range, the analysis component 412 can compare the multimedia data 1804 received from the user's client device with the appropriate subsets of indexed data corresponding to that automation system or machine (e.g., previously indexed reference images, audio, or video for the relevant automation system or machine, previously indexed maintenance recordings or notes for the automation system or machine, appropriate device documentation, troubleshooting information obtained from appropriate device vendor websites, etc.) and determine whether the received multimedia data is indicative of an operational or maintenance issue that merits notification of the user 1802. Analysis carried out by the analysis component 412 may include, for example, the comparative analysis described above in connection with FIGS. 16 and 17.

As shown in FIG. 18B, in response to detection of an operational or maintenance issue based on analysis performed by the analysis component 412 on the received multimedia data (in view of data model 202), notification component 414 can generate notification data 1808 identifying the issue, and cause the device interface component 416 to deliver this notification data 1808 to the user's wearable computer or client device. The device interface component 416 can format the notification data for presentation on the user's device based on the device type information collected by the indexing system 520. For example, if the user is viewing the affected automation system through a wearable computer, the device interface component 416 may superimpose a graphic within the user's viewing field indicating the affected machine or device, together with text describing the issue and, if available, a possible countermeasure for correcting the issue.

Although FIG. 18B depicts the notification being sent to the same user from which the multimedia data was received, in some embodiments, the notification component 414 can direct the notification data 1808 to other user suitable recipients in accordance with the notification rules 1512. In this regard, notification rules 1512 may define which plant employees are to receive notification of a detected event based on the type of the event identified by the analysis component 412. For example, the notification rules 1512 may define which maintenance persons are responsible for maintaining the automation system or machine to which the notification pertains. Accordingly, when a possible maintenance issue is detected by analysis component 412 based on audio and/or visual data received from a user within proximity of the automation system, the notification component 412 can direct the notification to the one or more appropriate maintenance persons defined as being responsible for that particular automation system.

Also, in such embodiments in which notifications are directed to users who are not currently near the affected automation system or machine, the notification information may include guidance information that guides the recipient to the location of the detected issue. For example, if the notification information is sent to a wearable computer worn by the recipient, the device interface component 416 can superimpose graphics or text within the user's visual field that guides the user to the affected automation system or machine. Once the system 402 has determined (based on the recipient's current location information) that the recipient has arrived at the affected system, the device interface component 416 can deliver further guidance information directing the user to the particular portion of the automation system or machine that is experiencing the issue. For example, the device interface component may superimpose arrows or other graphical icons indicating the source of the issue (e.g., a pump that may be leaking, a belt that may be slipping, etc.) together with textual information describing the detected issue.

Figure 19:
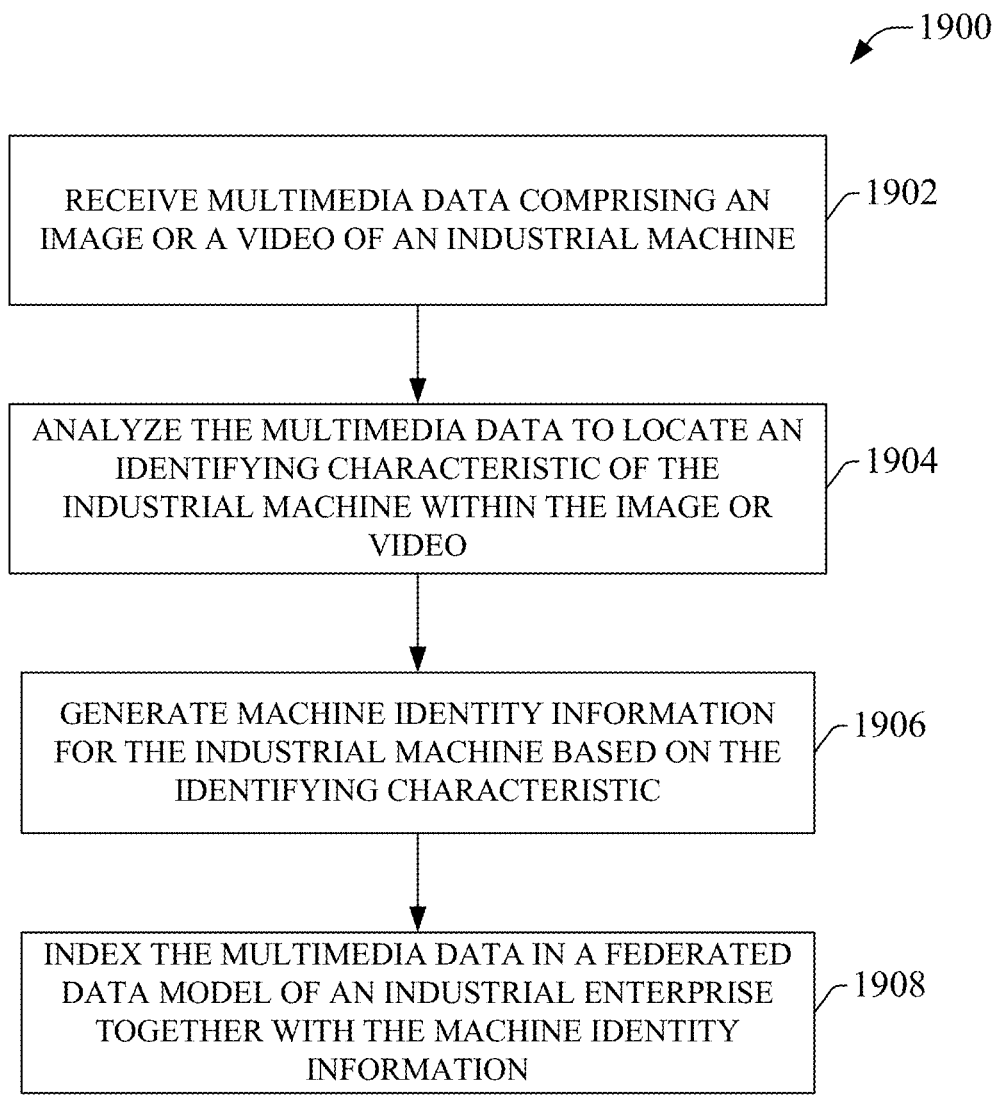
FIG. 19 is a flowchart of an example methodology for indexing multimedia data in a federated data model of an industrial search and diagnosis system.
Figure 20:
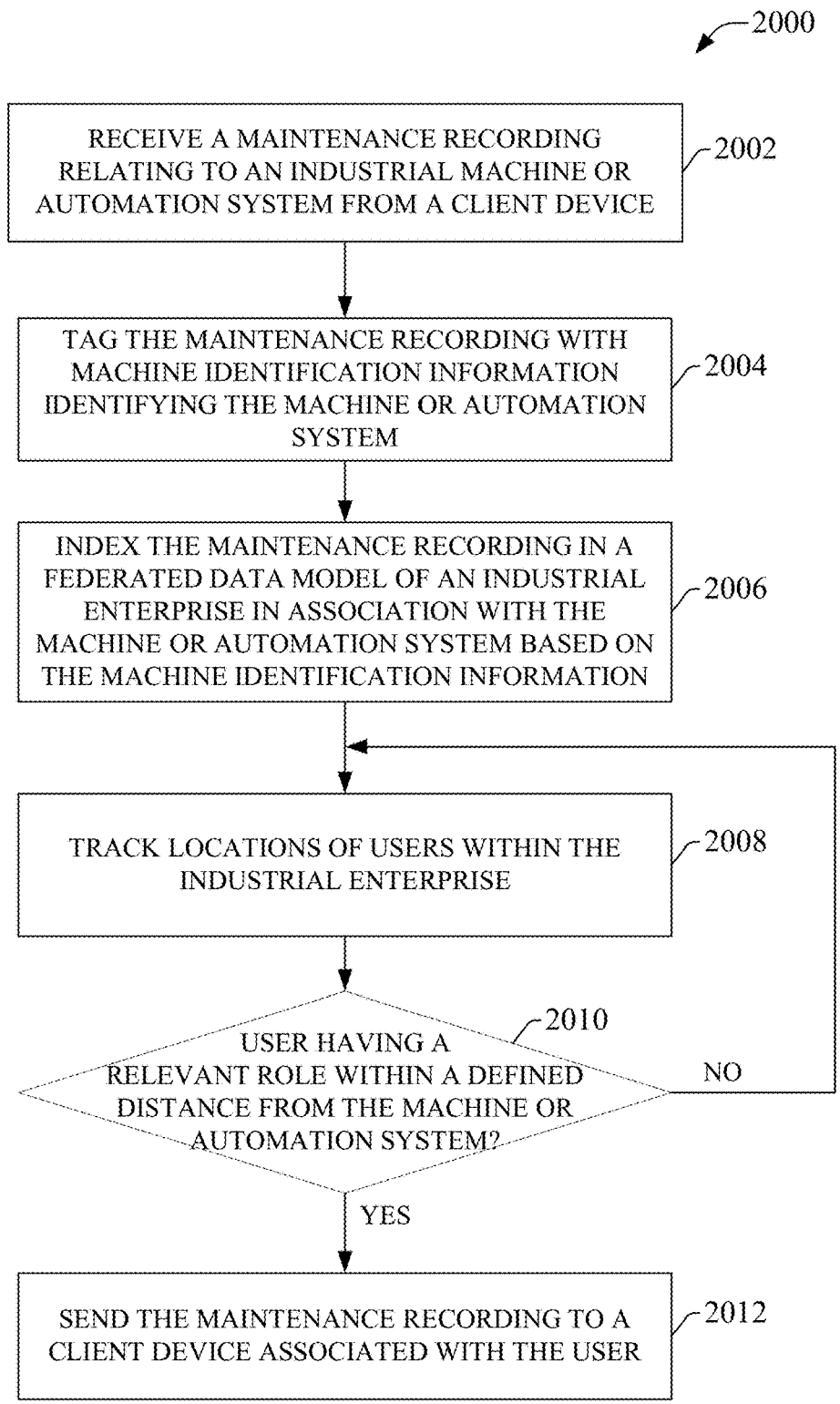
FIG. 20 is a flowchart of an example methodology for indexing and deploying maintenance recordings in an industrial environment.
Figure 21:
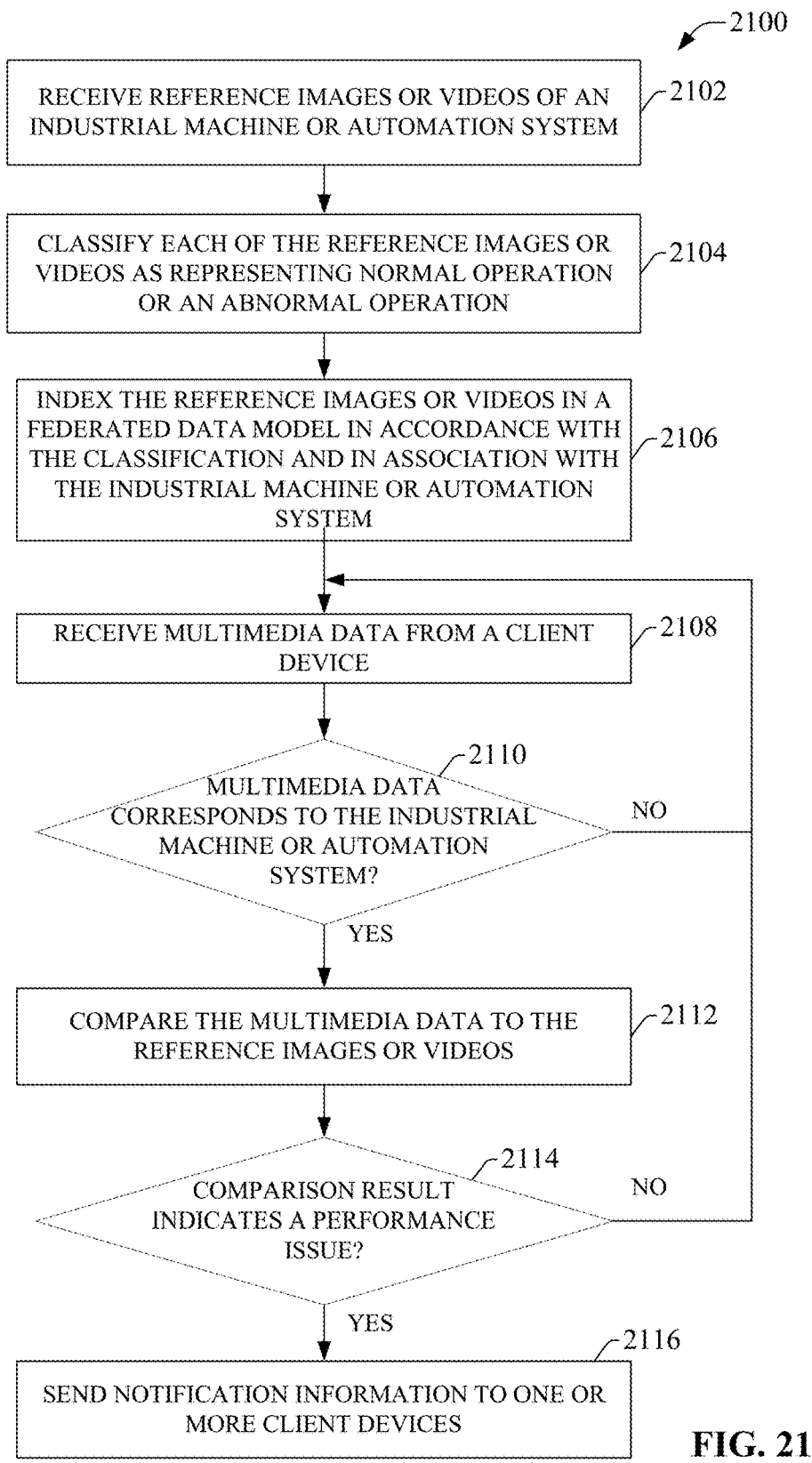
FIG. 21 is a flowchart of an example methodology for diagnosing automation system performance issues using multimedia data.

FIGS. 19-21 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 19 illustrates an example methodology 1900 for indexing multimedia data in a federated data model of an industrial search and diagnosis system. Initially, at 1902, multimedia data comprising an image or a video of an industrial machine is received. In one or more embodiments, the multimedia data can be received at an industrial search and diagnosis system from a client device that capture the multimedia data (e.g., a wearable computer, a portable camera or multipurpose personal device, etc.). At 1904, the multimedia data is analyzed to locate an identifying characteristic of the industrial machine within the image or video. This analyzing step can be performed, for example, by a transform component of the industrial search and diagnosis system. In an example analysis, the transform component may be configured to recognize presence of a nameplate on the industrial machine recorded in the image or video. In an example embodiment, the transform component may identify the nameplate based on physical characteristics of the nameplate itself (e.g., the shape, dimensions, and/or color of the nameplate). Alternatively, the transform component may first identify the type of the machine based on physical characteristics of the machine, then focus its analysis on an area of the machine at which the nameplate is expected to be located based on the determined type of machine. In yet another example, the transform component may identify only physical characteristics of the machine itself as the identifying characteristics, without relying upon nameplate information.

At 1906, machine identity information for the industrial machine is generated based on the identifying characteristic identified at step 1904. For embodiments in which the identifying characteristic comprises a nameplate mounted to the machine, the identity information may be generated by performing optical character recognition on the text printed on the nameplate in order to extract machine identification information from this nameplate information (e.g., a machine model number, vendor information, etc.). Alternatively, the system may be configured to recognize characteristic physical attributes of the machine itself, and to correlate these physical attributes with reference attributes corresponding to various machine models and vendors in order to select the machine identity that most closely matches the recognized physical characteristics.

At 1908, the multimedia data received at step 1902 is indexed in a federated data model of an industrial enterprise together with the machine identity information generated at step 1906. The data model can represent a common namespace in which multiplatform data from a variety of data sources across an industrial enterprise is indexed for search and diagnostic purposes. The system may index the multimedia data in this data model for a variety of purposes. For example, the system may use the multimedia data as a visual reference that can be delivered to a user's client device when the corresponding industrial machine is invoked. The multimedia data may also serve as a reference image or video indicating either normal operation of the associated machine or an abnormal operation.

FIG. 20 illustrates an example methodology 2000 for indexing and deploying maintenance recordings in an industrial environment. Initially, at 2002, a maintenance recording relating to an industrial machine or automation system is received from a client device. The maintenance recording may be, for example, a voice message recorded on the client device by a maintenance person or other plant employee, which conveys spoken information about a maintenance status of the machine or automation system. The maintenance recording can be received at an industrial search and diagnostic system, as described above.

At 2004, the maintenance recording is tagged with machine identification information identifying the machine or automation system. In some embodiments, this identification information can be added to the maintenance recording by a transform component of the industrial search and diagnostic system. The machine identification system can be derived by the transform component using any suitable technique. For example, the search and diagnostic system may identify the current location of the client device from which the maintenance recording was received (e.g., based on location information received from the client device, or by tracking the client device as the user traverses the plant), and correlate this location information with recorded locations of the various industrial systems that make up the industrial enterprise. Based on this correlation, the system may determine that the user is within a defined range of a given industrial system, and tag the maintenance recording with machine identification information that identifies this industrial system. Alternatively, the owner of the client device may manually select or otherwise identify the industrial system to which the maintenance recording pertains via interaction with a graphical interface served by the system. At 2006, the maintenance recording is indexed in a federated data model of the industrial enterprise in association with the machine or automation system based on the machine identification information with which the recording was tagged at step 2004.

At 2008, locations of users within the industrial enterprise are tracked; e.g., by the search and diagnostic system to which the maintenance recording was submitted. At 2010, a determination is made as to whether a user having a role that is relevant to the maintenance recording has moved within a defined distance from the machine or automation system to which the recording relates. In this regard, the system may store notification rules that define, for each industrial system within the enterprise, which plant employees or user roles are to be notified in the event of a maintenance issue pertaining to that industrial system. If no user having a relevant role has moved within the defined distance (NO at step 2010), the methodology returns to step 2008, and the system continues to track the users. Alternatively, if a user having the relevant role has moved within the defined distance (YES at step 2010), the methodology proceeds to step 2012, where the maintenance recording is sent to a client device associated with the user for playback. In this way, the system can push voice messages that convey relevant maintenance information to appropriate users when those users are within a visual or audio range of the affected machines.

FIG. 21 illustrates an example methodology 2100 for diagnosing automation system performance issues using multimedia data. Initially, at 2102, reference images or videos of an industrial machine or automation system are received; e.g., at a search and diagnosis system used to assist in diagnosing industrial performance issues. At 2104, each of the reference images or videos are classified as representing normal operation of the corresponding industrial machine, or as representing an abnormal operation. Images or videos corresponding to an abnormal operation can be further classified according to the type of abnormality (e.g., a leaking pump, a slipping belt, a misaligned actuator, etc.). In some embodiments, the classification of the reference images or video may be based on classification information provided by a user as part of the submission process. Alternatively, some or all of the classification information may be inferred based on an analysis of the content of the video or image performed by the system. At 2106, the reference images or videos are indexed in a federated data model in accordance with the classification determined at step 2104, and in association with the industrial machine or automation system to which the respective images or videos relate.

At 2108, multimedia data is received from a client device. The multimedia data may comprise, for example, an image or a video of an industrial automation system or machine capture at some time after the reference images and video had been recorded. At 2110, a determination is made as to whether the multimedia data received at step 2108 corresponds to the industrial machine or automation system corresponding to the reference images or videos. If the multimedia data does not correspond to the industrial machine or automation system (NO at step 2110), the methodology returns to step 2108 and awaits receipt of other multimedia data. Alternatively, if the multimedia data corresponds to the industrial machine or automation system (YES at step 2110), the methodology proceeds to step 2112, where the multimedia data is compared with the reference images or videos.

At 2114, a determination is made regarding whether a result of the comparison performed at step 2112 indicates a performance issue with the industrial machine or automation system. For example, the comparison result may determine which of the reference images or videos most closely aligns with the visual characteristics contained in the multimedia data. If the multimedia data most closely aligns with the reference image or video corresponding to normal operation, then no performance issue is detected. Alternatively, if the multimedia data most closely aligns with one of the reference images or videos corresponding to an abnormal performance, it is determined that the multimedia data indicates occurrence of the abnormal issue corresponding to the matching reference.

If no performance issue is detected (NO at step 2114), the methodology returns to step 2108, and the system awaits receipt of other multimedia data. Alternatively, if a performance issue is detected (YES at step 2114), the methodology moves to step 2116, where notification information is sent to one or more client devices corresponding to relevant plant employees (e.g., as determined by notification rules stored by the search and diagnosis system).

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 22:
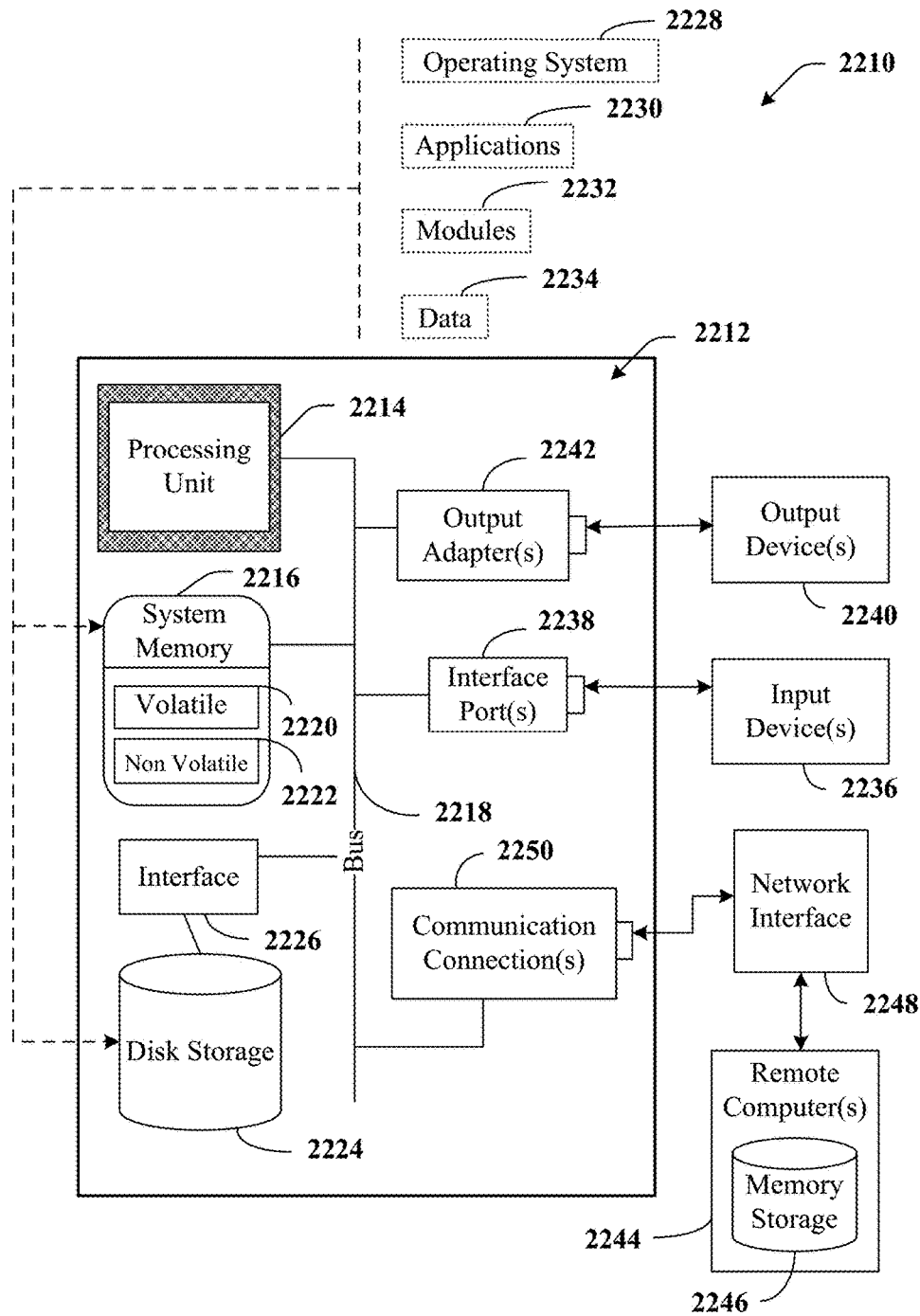
FIG. 22 is an example computing environment.
Figure 23:
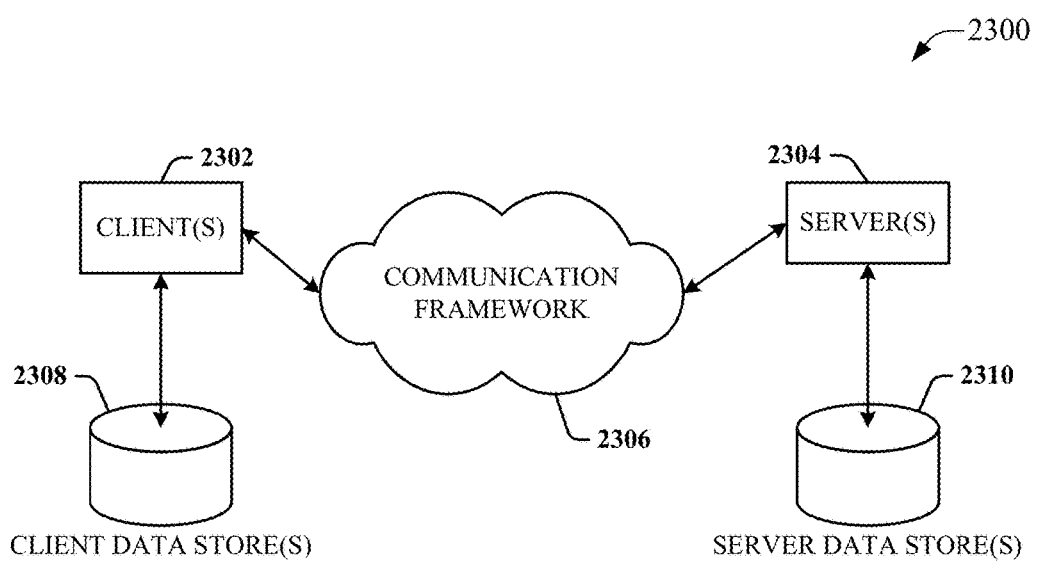
FIG. 23 is an example networking environment.

In order to provide a context for the various aspects of the disclosed subject matter, FIGS. 22 and 23 as well as the following discussion are intended to provide a brief, general description of a suitable environment in which the various aspects of the disclosed subject matter may be implemented.

With reference to FIG. 22, an example environment 2210 for implementing various aspects of the aforementioned subject matter includes a computer 2212. The computer 2212 includes a processing unit 2214, a system memory 2216, and a system bus 2218. The system bus 2218 couples system components including, but not limited to, the system memory 2216 to the processing unit 2214. The processing unit 2214 can be any of various available processors. Multi-core microprocessors and other multiprocessor architectures also can be employed as the processing unit 2214.

The system bus 2218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2216 includes volatile memory 2220 and nonvolatile memory 2222. The basic input/output system (BIOS), containing the basic routines to transfer information between elements within the computer 2212, such as during start-up, is stored in nonvolatile memory 2222. By way of illustration, and not limitation, nonvolatile memory 2222 can include read only memory (ROM), programmable ROM (PROM), electrically programmable ROM (EPROM), electrically erasable PROM (EEPROM), or flash memory. Volatile memory 2220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2212 also includes removable/non-removable, volatile/nonvolatile computer storage media. FIG. 22 illustrates, for example a disk storage 2224. Disk storage 2224 includes, but is not limited to, devices like a magnetic disk drive, floppy disk drive, tape drive, Jaz drive, Zip drive, LS-100 drive, flash memory card, or memory stick. In addition, disk storage 2224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2224 to the system bus 2218, a removable or non-removable interface is typically used such as interface 2226.

It is to be appreciated that FIG. 22 describes software that acts as an intermediary between users and the basic computer resources described in suitable operating environment 2210. Such software includes an operating system 2228. Operating system 2228, which can be stored on disk storage 2224, acts to control and allocate resources of the computer 2212. System applications 2330 take advantage of the management of resources by operating system 2228 through program modules 2232 and program data 2234 stored either in system memory 2216 or on disk storage 2224. It is to be appreciated that one or more embodiments of the subject disclosure can be implemented with various operating systems or combinations of operating systems.

A user enters commands or information into the computer 2212 through input device(s) 2236. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2214 through the system bus 2218 via interface port(s) 2238. Interface port(s) 2238 include, for example, a serial port, a parallel port, a game port, and a universal serial bus (USB). Output device(s) 2240 use some of the same type of ports as input device(s) 2236. Thus, for example, a USB port may be used to provide input to computer 2212, and to output information from computer 2212 to an output device 2240. Output adapters 2242 are provided to illustrate that there are some output devices 2240 like monitors, speakers, and printers, among other output devices 2240, which require special adapters. The output adapters 2242 include, by way of illustration and not limitation, video and sound cards that provide a means of connection between the output device 2240 and the system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. The remote computer(s) 2244 can be a personal computer, a server, a router, a network PC, a workstation, a microprocessor based appliance, a peer device or other common network node and the like, and typically includes many or all of the elements described relative to computer 2212. For purposes of brevity, only a memory storage device 2246 is illustrated with remote computer(s) 2244. Remote computer(s) 2244 is logically connected to computer 2212 through a network interface 2248 and then physically connected via communication connection 2250. Network interface 2248 encompasses communication networks such as local-area networks (LAN) and wide-area networks (WAN). LAN technologies include Fiber Distributed Data Interface (I-DDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 2248 can also encompass near field communication (NFC) or Bluetooth communication.

Communication connection(s) 2250 refers to the hardware/software employed to connect the network interface 2248 to the system bus 2218. While communication connection 2250 is shown for illustrative clarity inside computer 2212, it can also be external to computer 2212. The hardware/software necessary for connection to the network interface 2248 includes, for exemplary purposes only, internal and external technologies such as, modems including regular telephone grade modems, cable modems and DSL modems, ISDN adapters, and Ethernet cards.

FIG. 23 is a schematic block diagram of a sample computing environment 2300 with which the disclosed subject matter can interact. The sample computing environment 2300 includes one or more client(s) 2302. The client(s) 2302 can be hardware and/or software (e.g., threads, processes, computing devices). The sample computing environment 2300 also includes one or more server(s) 2304. The server(s) 2304 can also be hardware and/or software (e.g., threads, processes, computing devices). The servers 2304 can house threads to perform transformations by employing one or more embodiments as described herein, for example. One possible communication between a client 2302 and servers 2304 can be in the form of a data packet adapted to be transmitted between two or more computer processes. The sample computing environment 2300 includes a communication framework 2306 that can be employed to facilitate communications between the client(s) 2302 and the server(s) 2304. The client(s) 2302 are operably connected to one or more client data store(s) 2308 that can be employed to store information local to the client(s) 2302. Similarly, the server(s) 2304 are operably connected to one or more server data store(s) 2310 that can be employed to store information local to the servers 2304.

What is claimed is:

1. A system for facilitating diagnosis of industrial performance issues, comprising:
a memory that stores executable components;
a processor, operatively coupled to the memory, that executes the executable components, the executable components comprising:
a transform component configured to
receive multimedia data captured by a client device,
correlate location information representing a location of the client device at a time that the multimedia data was received with respective locations of automation systems recorded in a federated data model to yield a correlation result,
determine an automation system, of the automation systems, represented by the multimedia data based on the correlation result, and
tag the multimedia data with contextual information identifying the automation system represented by the multimedia data;
an indexing component configured to index the multimedia data in a federated data model of an industrial enterprise in association with the automation system based on the contextual information;
an analysis component configured to identify a performance issue associated with the automation system based on an analysis of the multimedia data; and
a notification component configured to send notification data to one or more recipient client devices in response to identification of the performance issue, the notification data including at least one of a guidance image or a guidance video.

2. The system of claim 1, wherein
the multimedia data is at least one of an image or a video, and
the transform component is configured to generate at least a portion of the contextual information based on an analysis of one or more identifying characteristics contained in the image or the video.

3. The system of claim 2, wherein the one or more identifying characteristics comprise at least one of nameplate information extracted from the image or video or a visual property of the automation system identified in the image or video.

4. The system of claim 1, wherein
the multimedia data comprises an audio maintenance recording recorded on the client device and submitted to the transform component, and
the notification component is further configured to deliver the maintenance recording to another client device in response to a determination that the other client device has moved within a defined distance from the automation system.

5. The system of claim 1, wherein
the indexing component is configured to classify the multimedia data as reference data in a selected one of multiple categories defined in the federated data model, and
the multiple categories comprise at least a first category representing normal operation of the automation system and one or more second categories representing respective one or more abnormal conditions of the automation system.

6. The system of claim 5, wherein
the multimedia data is first multimedia data,
the transform component is further configured to receive second multimedia data representing the automation system from the client device or another client device, and
the analysis component is configured to perform comparative analysis on the second multimedia data relative to the reference data, and to identify the performance issue associated with the automation system based on a result of the comparative analysis.

7. The system of claim 6, wherein the comparative analysis comprises
inferring, based on analysis of the first multimedia data and the second multimedia data, at least one of vibration rates of a machine component or product throughput rates of the automation system for each of the first multimedia data and the second multimedia data, and generating the result based on a comparison of the vibration rates or the product throughput rates for the first multimedia data and the second multimedia data.

8. The system of claim 6, wherein the notification component is configured to select the one or more recipient client devices based on one or more notification rules that define one or more notification recipients that are associated with the automation system.

9. The system of claim 1, wherein
the multimedia data comprises an audio maintenance recording recorded on the client device and submitted to the transform component,
the indexing component is configured to associate the maintenance recording with a human-machine interface terminal associated with the automation system identified by the transform component,
the executable components further comprise a device interface component configured to render an interactive link on the human-machine interface terminal indicating availability of the maintenance recording, and
the notification component is further configured to, in response to selection of the interactive link via the human-machine interface terminal, deliver the maintenance recording to the human-machine interface terminal.

10. The system of claim 5, wherein the one or more abnormal conditions comprise at least one of a leaking pump, a slipping belt, or excessive machine vibration.

11. The system of claim 6, wherein
the reference data has associated therewith metadata identifying a portion of an image or video represented by the second multimedia data that is to be analyzed for presence of a visual characteristic indicative of the performance issue, and
the analysis component is configured to perform the comparative analysis on the portion of the image or video indicated by the metadata.

12. A method for identifying industrial performance issues based on multimedia information, comprising:
receiving, by a system comprising at least one processor, multimedia data recorded by a client device;
receiving, by the system, location information identifying a location of the client device at a time that the multimedia data was received;
correlating, by the system, the location information with respective locations of automation systems recorded in a federated data model;
determining, by the system, an automation system, of the automation systems, represented by the multimedia data based on a result of the correlating;
tagging, by the system, the multimedia data with contextual information identifying the automation system represented by the multimedia data;
indexing, by the system and based on the contextual information, the multimedia data in a federated data model of an industrial enterprise in association with the automation system;
identifying, by the system based on an analysis performed on the multimedia data, a performance issue associated with the automation system; and
in response to the identifying, sending, by the system, notification data to one or more recipient client devices, the notification data including at least one of a guidance image or a guidance video.

13. The method of claim 12, wherein
the receiving comprises receiving at least one of an image or a video of the automation system, and
the tagging comprises generating at least a portion of the contextual information based on an analysis of one or more identifying characteristics contained in the image or the video.

14. The method of claim 13, wherein the tagging further comprises identifying, as the one or more identifying characteristics, at least one of nameplate information contained within the image or video or a visual property of the automation system recorded in the image or video.

15. The method of claim 12, wherein the receiving comprises receiving, as the multimedia data, an audio maintenance recording recorded on the client device, and the method further comprises:
tracking, by the system, a location of another client device associated with a user role defined as being responsible for the automation system; and
in response to determining, based on the tracking, that the location is within a defined distance from the automation system, sending, by the system, the audio maintenance recording to the other client device.

16. The method of claim 12, wherein the indexing comprises classifying the multimedia data in the federated data model as reference data representing one of normal operation of the automation system or an abnormal condition of the automation system.

17. The method of claim 16, wherein the multimedia data is first multimedia data, and the identifying the performance issue comprises:
receiving, by the system, second multimedia data representing the automation system from the client device or another client device;
performing, by the system, a comparative analysis that compares the second multimedia data with the reference data; and
identifying, by the system based on a result of the comparative analysis, the performance issue associated with the automation system.

18. A non-transitory computer-readable medium having stored thereon instructions that, in response to execution, cause a system comprising a processor to perform operations, the operations comprising:
receiving multimedia data recorded by a client device;
receiving location information that identifies a location of the client device at a time that the multimedia data was received;
correlating the location information with respective locations of automation systems recorded in a federated data model;
identifying an automation system, of the automation systems, represented by the multimedia data based on a result of the correlating;
appending contextual information to the multimedia data, the contextual information identifying the automation system represented by the multimedia data;
indexing, based on the contextual information, the multimedia data in a federated data model of an industrial enterprise in association with the automation system;
identifying, based on an analysis performed on the multimedia data, a performance issue associated with the automation system; and
in response to the identifying the performance issue, sending notification data to one or more recipient client devices, the notification data including at least one of a guidance image or a guidance video.

19. The non-transitory computer-readable medium of claim 18, wherein the receiving the multimedia data comprises receiving at least one of an image or a video of the automation system, and the appending comprises generating at least a portion of the contextual information based on an analysis of one or more identifying characteristics contained in the image or the video.

20. The non-transitory computer-readable medium of claim 19, wherein the one or more identifying characteristics comprise at least one of nameplate information extracted from the at least one of the image or the video or a visual property of the automation system identified in the at least one of the image or the video.

* * * * *